(12) United States Patent
Nett et al.

(10) Patent No.: US 10,690,377 B2
(45) Date of Patent: Jun. 23, 2020

(54) CYCLONIC INLET AIR FILTER AND FLUID HEATING SYSTEMS AND COMBUSTION BURNERS HAVING THE SAME

(71) Applicant: Fulton Group N.A., Inc., Pulaski, NY (US)

(72) Inventors: Carl Nicholas Nett, Pulaski, NY (US); Keith Richard Waltz, Pulaski, NY (US)

(73) Assignee: FULTON GROUP N.A., INC., Pulaski, NY (US)

( * ) Notice: Subject to any disclaimer, the term of this patent is extended or adjusted under 35 U.S.C. 154(b) by 0 days.

(21) Appl. No.: 15/648,227

(22) Filed: Jul. 12, 2017

(65) Prior Publication Data

US 2017/0307253 A1    Oct. 26, 2017

Related U.S. Application Data

(63) Continuation-in-part of application No. PCT/US2016/012436, filed on Jan. 7, 2016.

(Continued)

(51) Int. Cl.
| | |
|---|---|
| *F24H 1/20* | (2006.01) |
| *F24H 9/00* | (2006.01) |
| *F23D 14/72* | (2006.01) |
| *F23D 14/68* | (2006.01) |
| *F23D 14/62* | (2006.01) |
| *F24H 9/20* | (2006.01) |
| *F23D 14/24* | (2006.01) |
| *B01D 45/12* | (2006.01) |

(Continued)

(52) U.S. Cl.
CPC ............. *F24H 1/205* (2013.01); *B01D 45/12* (2013.01); *B01D 45/18* (2013.01); *F23C 7/00* (2013.01); *F23D 14/24* (2013.01); *F23D 14/62* (2013.01); *F23D 14/68* (2013.01); *F23D 14/72* (2013.01); *F23L 5/02* (2013.01); *F24H 9/0042* (2013.01); *F24H 9/2035* (2013.01)

(58) Field of Classification Search
CPC ... B01D 45/18; F23C 7/00; F23L 5/02; F23D 14/68; F23D 14/72; F24H 9/0042; F24H 9/2035; F24H 1/205
See application file for complete search history.

(56) References Cited

U.S. PATENT DOCUMENTS

| | | | | |
|---|---|---|---|---|
| 3,190,627 A | * | 6/1965 | Goins | C09C 1/58 34/363 |
| 4,148,723 A | | 4/1979 | Mozley | |

(Continued)

FOREIGN PATENT DOCUMENTS

CN    103692357 A  *  4/2014

OTHER PUBLICATIONS

BanksEngineering, AboutRTOs, Oct. 2007, http://banksengineering.com/About%20RTOs%20Banks%20Engineering%2010-8-2007.pdf.*

(Continued)

*Primary Examiner* — Steven S Anderson, II
(74) *Attorney, Agent, or Firm* — McCormick, Paulding & Huber PLLC

(57) ABSTRACT

A combustion gas supply system and method includes: a cyclonic air filter (or separator), a blower having an inlet and an outlet, and a combustible gas inlet, wherein the cyclonic air filter, the blower, and the combustible gas inlet are in fluid communication.

30 Claims, 22 Drawing Sheets

Related U.S. Application Data

(60) Provisional application No. 62/125,039, filed on Jan. 12, 2015.

(51) Int. Cl.
*B01D 45/18* (2006.01)
*F23C 7/00* (2006.01)
*F23L 5/02* (2006.01)

(56) References Cited

U.S. PATENT DOCUMENTS

| | | | |
|---|---|---|---|
| 4,162,905 A | | 7/1979 | Schuler |
| 4,354,825 A | * | 10/1982 | Fisher .................. F23K 1/04 |
| | | | 110/224 |
| 4,373,228 A | | 2/1983 | Dyson |
| 4,387,654 A | * | 6/1983 | Binasik ................. C21B 13/08 |
| | | | 110/106 |
| 4,938,155 A | * | 7/1990 | Williams .............. F23G 5/006 |
| | | | 110/220 |
| 4,956,271 A | * | 9/1990 | Milone .................. F26B 3/08 |
| | | | 34/580 |
| 4,971,026 A | | 11/1990 | Fineblum |
| 5,403,367 A | | 4/1995 | De Villiers et al. |
| 5,961,701 A | * | 10/1999 | Hlynsky ............... B01D 45/12 |
| | | | 55/355 |
| 6,135,035 A | * | 10/2000 | Masek .................. C05F 3/00 |
| | | | 110/228 |
| 6,482,245 B2 | | 11/2002 | Brilmaker |
| 6,921,424 B2 | | 7/2005 | Bugli et al. |
| 9,017,441 B1 | * | 4/2015 | Vemuri ................. B01D 45/18 |
| | | | 55/432 |
| 2001/0042713 A1 | | 11/2001 | Conrad et al. |
| 2006/0246386 A1 | | 11/2006 | Webb et al. |
| 2007/0221491 A1 | * | 9/2007 | Araki .................... C10B 53/02 |
| | | | 201/41 |
| 2010/0102150 A1 | * | 4/2010 | Maeda ................. B02C 13/08 |
| | | | 241/18 |
| 2010/0178624 A1 | * | 7/2010 | Srinivasachar ........ F23K 5/002 |
| | | | 431/253 |
| 2010/0288230 A1 | | 11/2010 | McCauley et al. |
| 2011/0203238 A1 | * | 8/2011 | Witter ................ B01D 46/0093 |
| | | | 55/356 |
| 2012/0174431 A1 | * | 7/2012 | Cash .................... B01D 53/62 |
| | | | 34/493 |
| 2013/0319347 A1 | * | 12/2013 | Fioriti .................. F24H 1/10 |
| | | | 122/13.01 |

OTHER PUBLICATIONS

International Search Report for International Application No. PCT/US2016/012436 dated Apr. 25, 2016.
Written Opinion for International Application No. PCT/US2016/012436 dated Apr. 25, 2016.
Holt, et al., "Evaluation of static pressure drops and PM10 and TSP Emissions for modified 1D-3D cyclones", Transactions of the ASAE. American Society of Agricultural Engineers, vol. 42(6): 1541-1547, Dec. 1999.
Elsayed, Khairy, "Analysis and Optimization of Cyclone Separators Geometry Using RANS and LES Methodologies",Vije Universiteit Brussel, Department of Mechanical Engineering, Oct. 2011.
Wang, et al., "Performance Characteristics of Cyclones in Cotton-Gin Dust Removal", Agricultural Engineering International: the CIGR Journal of Scientific Research and Development. Manuscript BC 02 001. vol. IV. Aug. 2002.
Wang, Lingjuan, "Theoretical Study of Cyclone Design", Office of Graduate Studies of Texas A&M University, May 2004.
Decker Brand Boilers, Manufactured by Fabworks Inc., Oct. 2018, http://deckerbrand.com/wp-content/uploads/2016/06/FabWorks-Brochure_final.pdf.
Funk, et al., "Entrance Velocity Optimization for Modified Dust Cyclones", The Journal of Cotton Science, vol. 4, Issue 3, 178-182, 2000.

* cited by examiner

US 10,690,377 B2

CYCLONIC INLET AIR FILTER AND FLUID HEATING SYSTEMS AND COMBUSTION BURNERS HAVING THE SAME

CROSS-REFERENCE TO RELATED APPLICATION

This application claims priority to PCT Application No. PCT/US2016/012436, filed on Jan. 7, 2016, which claims the benefit of U.S. Provisional Application No. 62/125,039, filed on Jan. 12, 2015, and, each of which is incorporated herein by reference in its entirety to the extent permitted by applicable law.

BACKGROUND

Fluid heating systems, including steam, hydronic (water), and thermal fluid boilers, constitute a broad class of devices for producing a heated fluid for use in domestic, industrial, and commercial applications. In many such systems, heat energy is generated by a burner that consumes a fuel-air mixture in a sustained combustion process. Thermal energy from the combustion is then transferred from the hot combustion gases to a production fluid by a heat exchanger before the cooled combustion gas is released into the environment. In some fluid heating systems the fuel-fired burner is engineered as an integrated unit in concert with a blower, the heat exchanger, fluid conduits, and control system. Other fluid heating systems utilize a separate pre-assembled or "packaged" burner unit that can include a burner, blower, windbox, piping, wiring, flame safeguard, and a control system.

The production capacity of commercial fluid heating systems decreases during use. In addition, modern mesh burners, which are desirable to obtain high efficiency and satisfy emissions requirements, have an undesirable failure rate. Thus there remains a need for a heating system that provides a more stable production capacity and improved lifetime.

SUMMARY

Disclosed is a combustion gas supply system including: a cyclonic air filter; a blower having an inlet and an outlet; and a combustible gas inlet, wherein the cyclonic air filter, the blower, and the combustible gas inlet are in fluid communication.

Also disclosed is a fluid heating system including: a combustion gas supply system including a cyclonic air filter, a blower having an inlet and an outlet, a combustible gas inlet, and a burner, wherein the cyclonic air filter, the blower, the combustible gas inlet, and the burner are in fluid communication; and a heat exchanger, wherein the heat exchanger is in fluid communication with the burner.

Also disclosed is a method of producing a combustible gas, the method including: directing air with a blower through a cyclonic filter to produce filtered air; and mixing the filtered air with a fuel to form the combustible gas.

Also disclosed is a method of servicing a combustible gas supply system, the method including: filtering inlet air which includes debris with a cyclonic filter to separate the debris from the inlet air and produce filtered air; collecting the debris in a debris receptacle; mixing the filtered air with a combustible gas; and opening a bottom plate of the debris receptacle to remove the debris from the debris receptacle to service the combustible gas supply system.

Also disclosed is a fluid heating system including: a combustion gas supply system including a cyclonic air filter, a blower having an inlet and an outlet, wherein an outlet of the cyclonic air filter is connected to the inlet of the blower, a burner, wherein an inlet of the burner is connected to an outlet of the blower, a combustible gas inlet, which is disposed between an inlet of the cyclonic air filter and the inlet of the burner, wherein the cyclonic air filter, the blower, the combustible gas inlet, and the burner are in fluid communication, and wherein the cyclonic air filter includes a removable debris receptacle; and a heat exchanger, wherein the heat exchanger is in fluid communication with the burner.

The details of one or more embodiments of the present disclosure are set forth in the accompanying drawings and the description below. The above and other features, objects, and advantages of the invention will be apparent from the description and drawings, and from the claims.

DETAILED DESCRIPTION

Figure 1A:
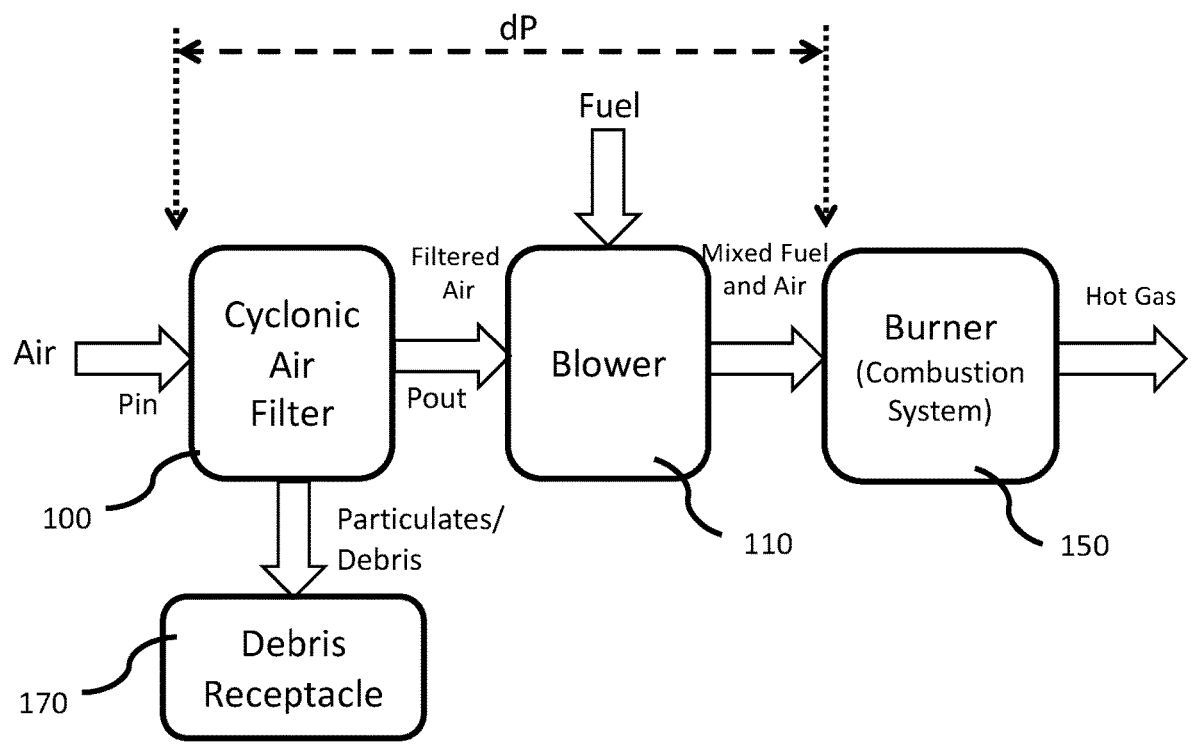
FIG. 1A is a block diagram of an embodiment of a fluid heating system in accordance with embodiments of the present disclosure.

To sustain a combustion process, burners consume air from the ambient environment. For fluid heating systems such as hydronic, steam and thermal fluid boiler, burner inlet airflows are typically in the velocity range of about 12 to 18 meters per second with airflow volumes of about 0.03 cubic meters per second to about 3 cubic meters per second. Particulate contaminates, if ingested by a heating system, can foul or damage a combustion burner, particularly mesh burners that incorporate a fine porous mesh substrate on which combustion is sustained. Because ambient air often contains particulate matter, the burner inlet air is often filtered, e.g., filtered using a fibrous mesh filter, such as a filter comprising a paper, foam, cotton, or other type of porous mesh, to remove the particulate matter. Mesh filters can be desirable in part because they are low cost, need not have any moving parts, and thus represent an uncomplicated method of filtration.

It has been unexpectedly discovered that the decrease in the production capacity of many heating systems stems from the use of a combination of open loop controls, e.g., venturi or flow matching controls, often with a constant speed fan, in combination with a fibrous mesh air filter. We have found that one reason for this effect is that as the filter becomes clogged over time with particulates from the air, the pressure drop across the filter increases, resulting in an increased total pressure ratio across the fan and reduced air flow. Because of the reduced airflow, the open loop control reduces gas flow to the burner in response, thereby reducing the maximum rate of combustion and decreasing production capacity. This effect can also occur with closed loop control systems, e.g., systems which employ an oxygen (or other) sensor and trim capability, when the control system adapts to reduced airflow.

It has also been unexpectedly discovered that the reduced airflow contributes to premature failure of mesh burners, which are increasingly popular because of their desirable emissions characteristics. Premature burner failure can result when the airflow rate and the air-fuel mixture delivered to the burner are reduced, resulting in irregularities and instabilities in the combustion process, as well as inhomogeneities on the surface of the burner mesh that damage the mesh substrate.

Furthermore, the reduced airflow can also result in increased undesired emissions as the airflow and air-fuel mixture deviate from the burner design point, and as the mesh substrate becomes fouled. As is further disclosed herein, by providing a constant-pressure filtered airstream to the burner, operation at the burner design point results in improved combustion efficiency and reduced emissions.

Finally, fan blade fouling also contributes to losses and change in performance. Filtering the inlet air stream prior to the fan mitigates this effect so long as the presence of the filter does not starve the burner for adequate airflow.

These detrimental effects manifest in fluid heating systems differently, depending upon the type of burner control system utilized. Fully closed loop systems, where the flow of fuel, air, and the resulting excess $O_2$ in the flue gas is monitored and that feedback comes back to a controlling device which adjusts the actuators, are most resistant to the issues outlined above, as they can control within the capacity of the fan and gas supply system. Such systems are complex and costly and, as a result, not typically employed in a certain applications, particularly hydronic, steam and thermal fluid boilers. Nevertheless, when they are utilized, alleviating the detrimental effects of reduced airflow is beneficial because the variable capacity of the air and combustion systems components in such systems are typically limited and the mean-time-between-maintenance (MTBM) is important.

In open-loop systems where the airflow through a venturi provides some feedback data to a gas valve controller, the amount of controllable effect is limited. Typically, these are ratio control systems where the control objective is to keep the flow ratio of gas and air the same over all burner firing ranges. Reduced airflow in these systems are problematic, since fouling (equivalent to an increase in pressure drop) acts to reduce gas flow to match the air flow to the burner and causes a reduction in system capacity. It can also result in condition that the minimum firing rate is pushed below its lower design limit, which can directly lead to premature burner failure. In some embodiments, a variable speed fan is provided where the controller acts to meter the gas flow based on the air stream, but with no actual closed-loop control of the airflow rate. These systems suffer primarily from low MTBM issues, and the burner failures due to operation outside the range. They can also have emissions performance issues due to fouling.

Finally, in a fully open loop system (where none of the dynamic parameters are measured), the fan speed, gas valve position and air valve position are determined from a pre-ordained open loop schedule. These suffer from changing emissions due to fouling, and from pre-mature burner failure due to operation outside the acceptable firing rate and/or air-fuel ratio range.

One reason why the cause of the foregoing effects have remained elusive is because the rate at which a fibrous air filter clogs is highly variable, and because the reduced airflow depends on the size, concentration, and composition of the airborne particulate debris, which can vary over long periods, e.g., seasonally, and over short periods, e.g., within a work day. This results in unpredictable variability in the time period over which the heating system or packaged burner can be operated before the filter is sufficiently loaded so as to result in significantly reduced airflow. Also, in operating environments where the concentration of particulate debris is high, the mean-time-between-maintenance (MTBM) for service events may therefore be short, requiring frequent operator intervention, resulting in a recurring operational cost and potential lifecycle limit due to the availability of replacement parts.

Disclosed in FIG. 1A is a system-level block diagram of a combustion gas supply system of the present disclosure, which includes a cyclonic air filter 100 that separates particulate matter from the inlet air and provides filtered output air. The cyclonic air filter 100 receives the inlet air at a pressure of $P_{in}$ and provides filtered output air at a pressure of $P_{out}$ resulting in a pressure drop across the cyclonic air filter 100. A debris collector 170 receives and collects the separated particulate matter from the cyclonic air filter 100 for later disposal. The filtered output air is provided to a blower (or fan) 110 that pulls air through the cyclonic inlet air filter 100, mixes the filtered air with input fuel and provides the fuel/air mixture to a burner (or combustion system) 150 which produces a stream of heated or hot gas. It is understood by those skilled in the art that burner combustion is typically initiated using either an igniter subsystem, or an igniter coupled to a pilot flame (not shown).

Figure 1B:
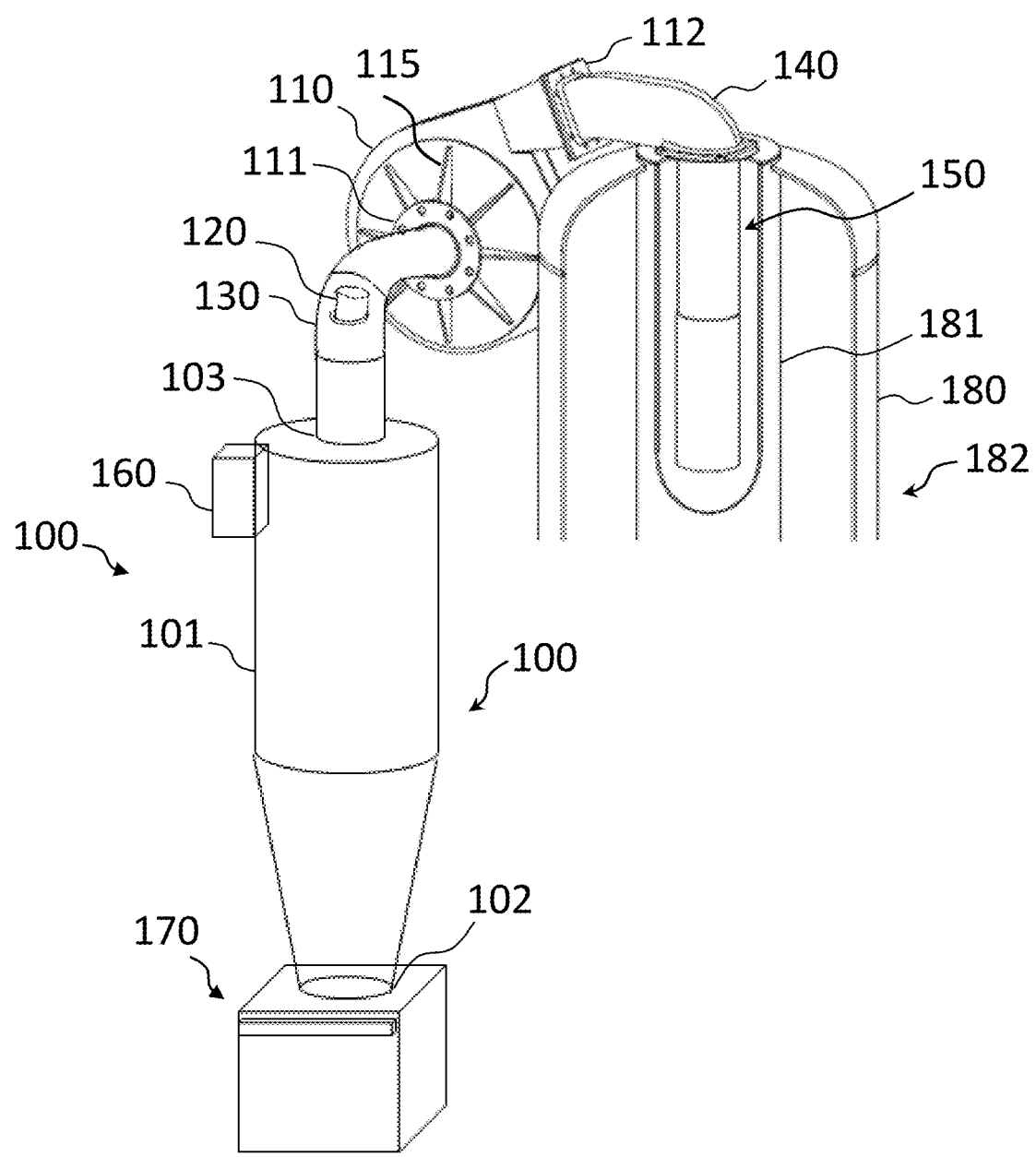
FIG. 1B is a diagram of an embodiment of a fluid heating system in accordance with embodiments of the present disclosure.

Disclosed in FIG. 1B is a combustion gas supply system comprising: a cyclonic air filter 100; a blower (or fan) 110 having an inlet 111 and an outlet 112; and a combustible gas (or fuel) inlet 120, wherein the cyclonic air filter 100, the blower 110, and the combustible gas inlet 120 are in fluid communication. As shown in FIG. 1B, the cyclonic air filter 100 is upstream of the burner 150 and filters the air entering the burner 150 when in operation. Also, the air filter 100 may be connected to the blower 110 by a conduit 130. Also, the outer housing of the blower 110 may have stiffening ribs 115 to provide mechanical stability or stiffness to the blower 110. An example of a blower 110 may be a centrifugal blower, made of heavy gauge steel, such as "Eclipse SMJ Series Turbo Blower", part number SMJ 101016, made by Honeywell, Inc. However, any suitable blower that provides the function and/or performance requirements described herein may be used if desired.

It has been unexpectedly discovered that a cyclonic air filter can be utilized to separate inlet air debris from the intake of the combustion system that satisfies the design requirements for a fluid heating system burner. These requirements dictates filtration of small particles (larger than approximately 10 micrometer aerodynamic diameter), physical dimensions that are sufficiently compact to be practicable at the necessary airflow volumes and flow rates, and separator pressure drop comparables with mesh filters with similar filtration properties.

Figure 2:
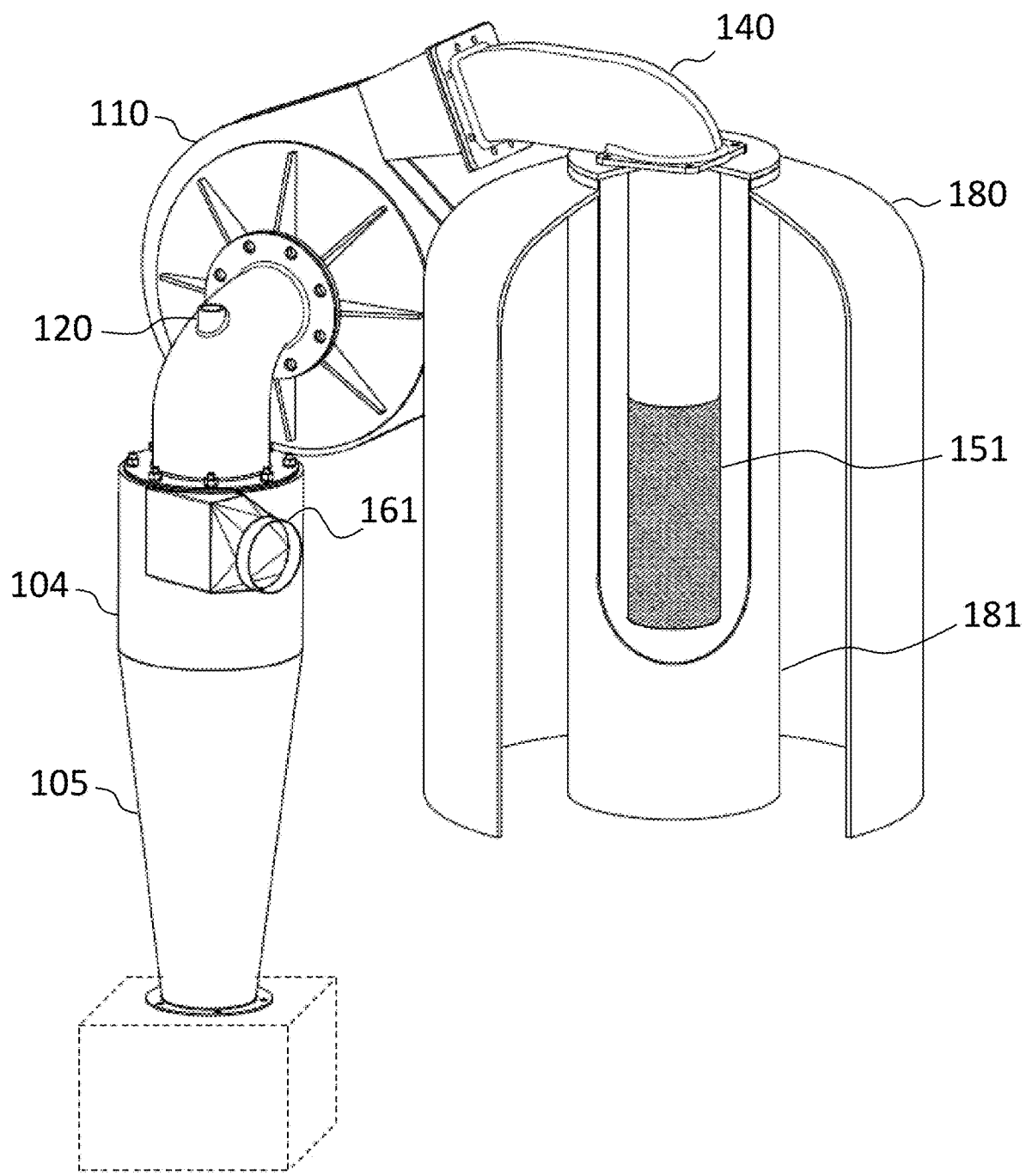
FIG. 2 is a diagram of another embodiment of the fluid heating system, in accordance with embodiments of the present disclosure.
Figure 3:
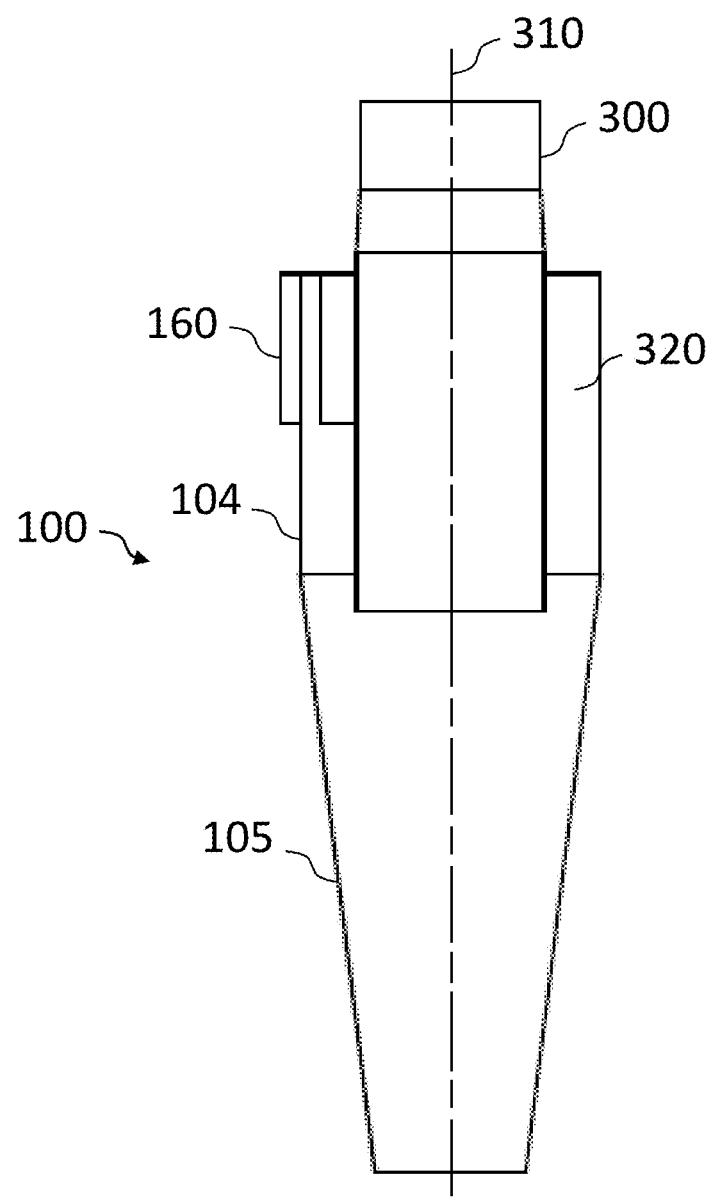
FIG. 3 is a side longitudinal cross-sectional view of an embodiment of a cyclonic air filter, in accordance with embodiments of the present disclosure.

The cyclonic air filter 100 comprises an inlet 160 disposed on a body 101 of the cyclonic air filter, and an outlet 103, e.g., an air discharge opening, disposed on a top of the body 101. The inlet 160 may have any suitable shape. As shown in FIG. 1B, the inlet 160 may be rectilinear. As shown in FIG. 2, the inlet 161 may have a round or curvilinear opening. The body 101 of the cyclonic air filter is further illustrated in FIG. 3. The body 101 may comprise a barrel 104 which is disposed on a cone 105. The barrel 104 may have any suitable shape. A cylindrical shape is specifically mentioned. The cone 105 may also have any suitable shape. A frustoconical shape is specifically mentioned. The inlet 160 may be disposed on the barrel 104, on the cone 105, or on a combination thereof. An embodiment in which the inlet 160 is disposed on the barrel 104 is specifically mentioned. If desired, the cyclonic air filter 100 may further comprise an outlet member 300 as shown in FIG. 3. As shown in FIG. 3, the outlet member 300 may extend into the barrel 104 if desired, and can further extend into the cone 105 if desired.

Figure 4:
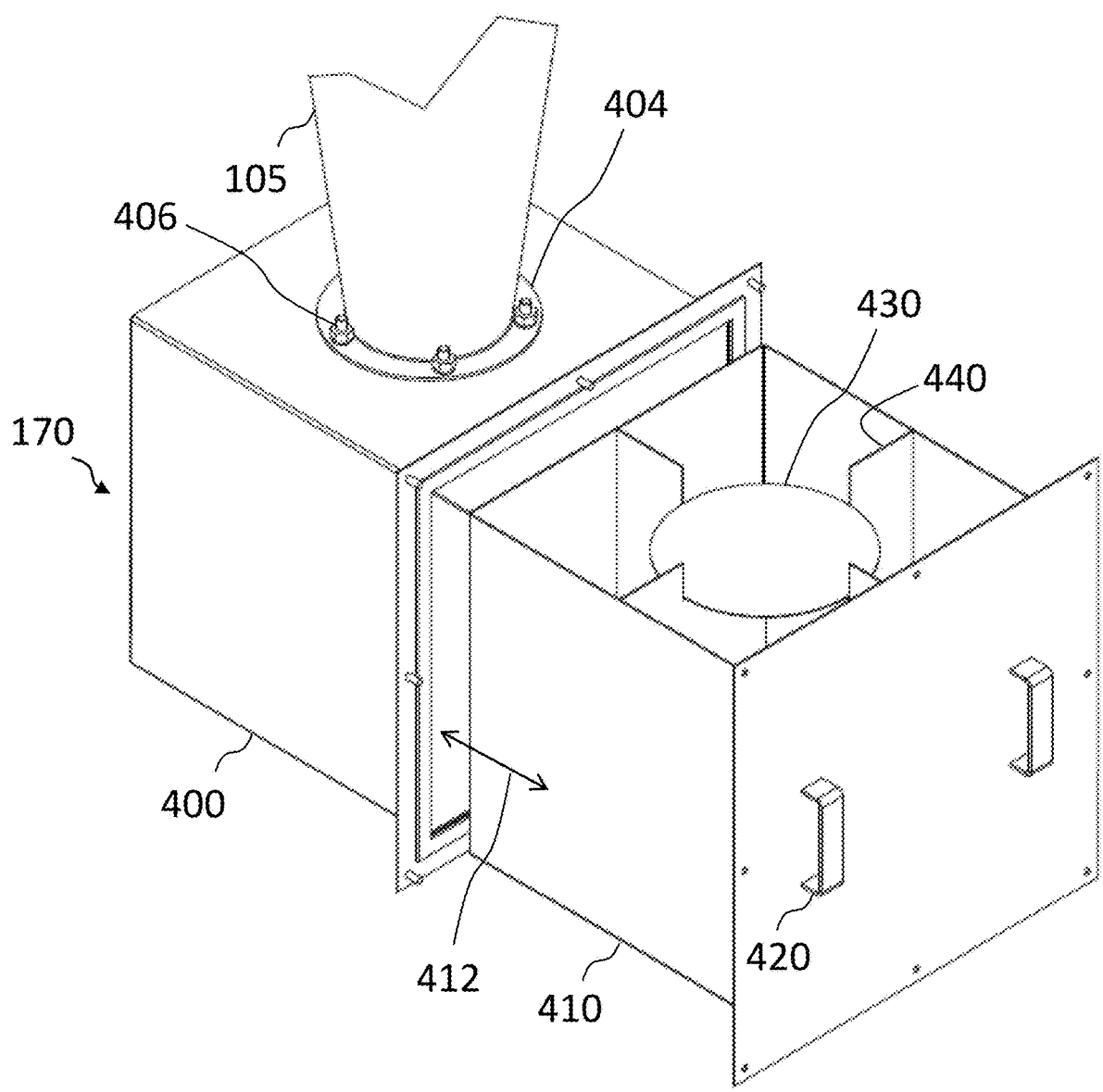
FIG. 4 is a perspective view of an embodiment of a debris receptacle of the cyclonic air filter, showing a removable component, in accordance with embodiments of the present disclosure.

A debris receptacle 170 may be disposed on a bottom 102 of the body 101 of the cyclonic air filter, e.g., on a debris discharge opening of the body 101 of the cyclonic air filter 100. As shown in FIG. 4, the debris receptacle 170 can be disposed on a bottom of the cone 105 of the cyclonic air filter 100. For example, there may be a flange 404 on the bottom of the cone 105 which is secured to the debris receptacle 170 by bolts 406. Any other technique for permanently or removably securing the debris receptacle 170 to the bottom of the cyclonic air filter 100 may be used if desired.

Figure 5:
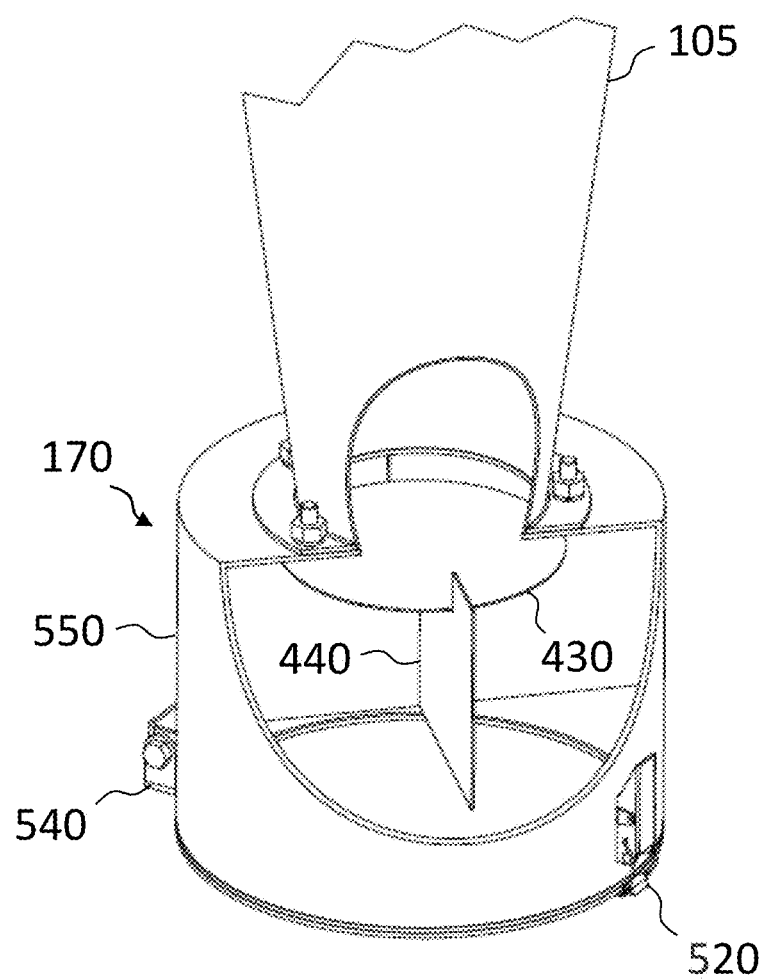
FIG. 5 is a partial cut-away perspective view showing another embodiment of the debris receptacle of the cyclonic air filter, in accordance with embodiments of the present disclosure.

An embodiment of the debris receptacle 170 is further illustrated in FIG. 4. As shown in FIG. 4, the debris receptacle 170 may comprise a housing 400 and a removable container or trap 410, which may be in the form of a removable drawer 410. The arrow 412 shows how the drawer 410 may slide into and out of the housing 400. The housing 400 and the container may each independently have any suitable shape that provides the function and/or performance described herein, and may have a rectilinear or curvilinear shape, and may be rounded or rectangular, or any other shape, if desired. As shown in FIG. 4, the debris receptacle 170 may be square. Alternatively, as shown in FIG. 5, the debris receptacle 170 may have a circular housing 550.

Figure 6:
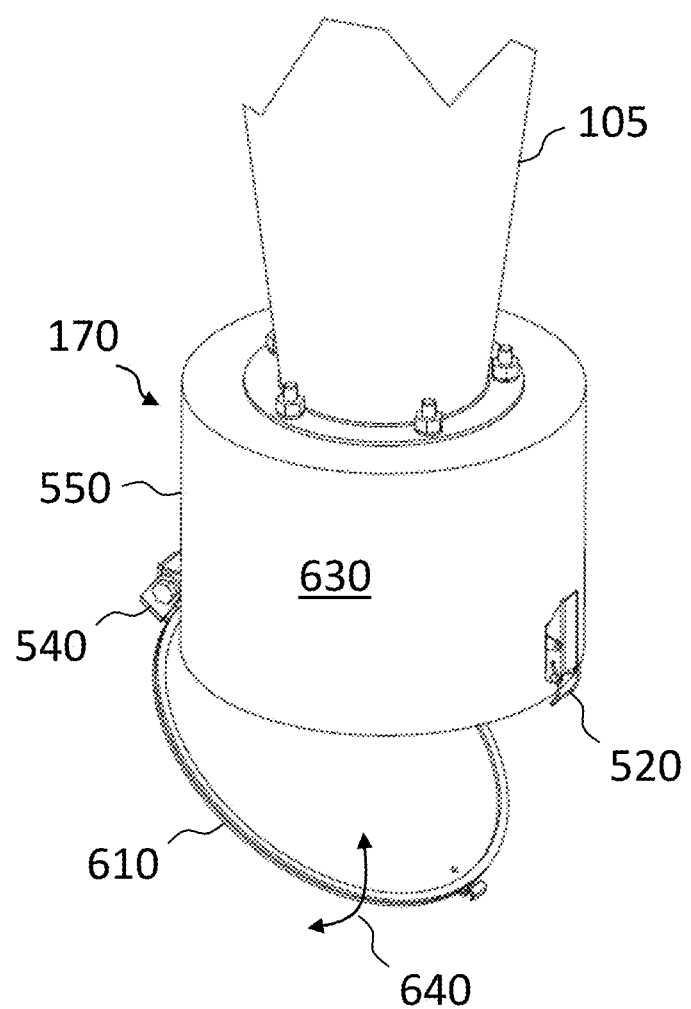
FIG. 6 is a perspective view of the debris receptacle of FIG. 5, showing a hinged base in an open position, in accordance with embodiments of the present disclosure.
Figure 7:
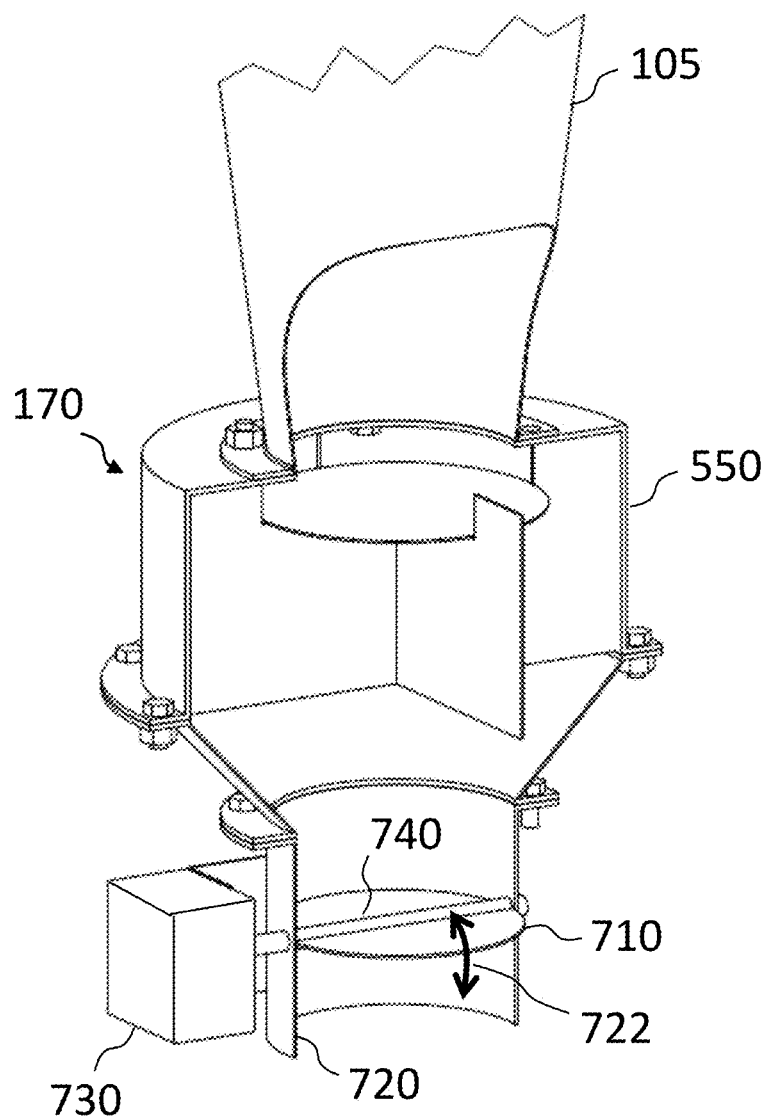
FIG. 7 is a partial cross-sectional diagram showing another embodiment of the debris receptacle of the cyclonic air filter showing a gate in a closed configuration, in accordance with embodiments of the present disclosure.
Figure 8:
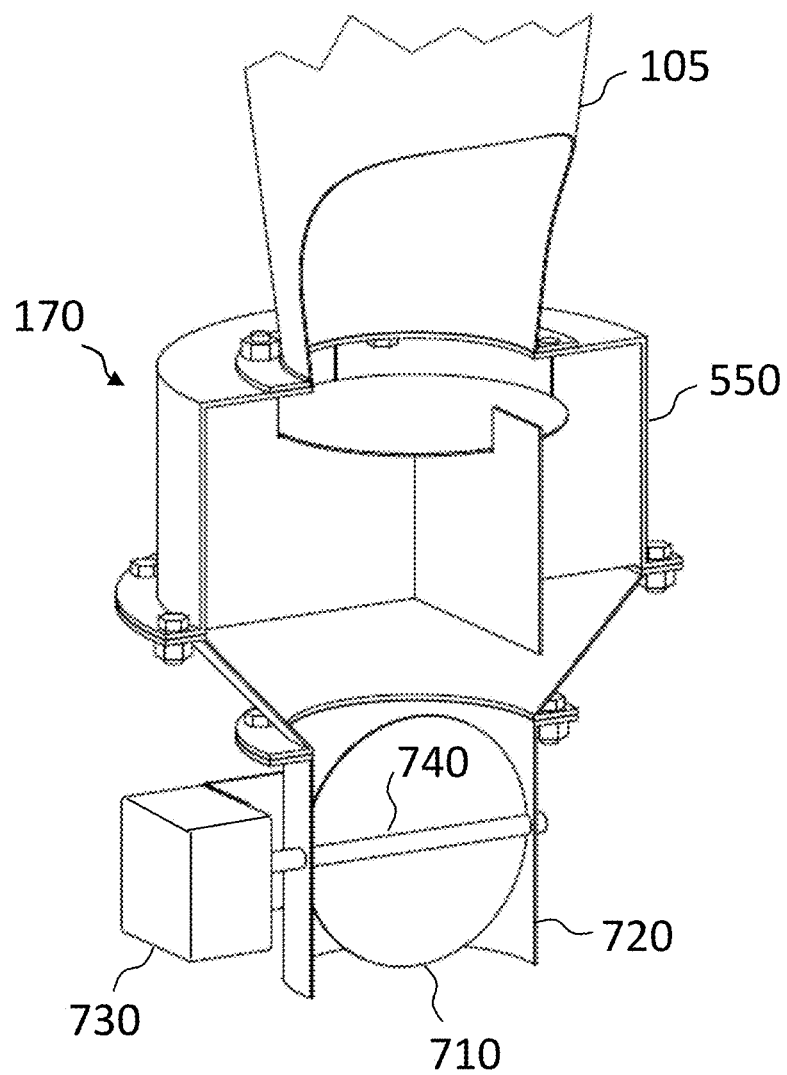
FIG. 8 is a partial cross-sectional diagram of the debris receptacle of FIG. 7 wherein the gate is in an open configuration, in accordance with embodiments of the present disclosure.

As also shown in FIG. 4, a handle 420 may be provided on the container 410. In some embodiments, as shown in FIG. 6, the housing 550 may comprise an articulated bottom plate 610, which can pivot on a hinge 540 and secured by a clasp 620. In such an embodiment, the bottom plate 610 may be hinged so that it can pivot as shown by the arrow 640 relative to a sidewall 630 of the debris receptacle 170, or hinged so that it can pivot relative to a latitudinal or longitudinal axis of the debris receptacle 170. In yet another embodiment, the debris receptacle may be configured for automated servicing. As shown in FIGS. 7 and 8, in some embodiments, the debris receptacle 170 may comprise an automated bottom plate, for example a bottom plate comprising a rotating gate 710, and a discharge port 720. As shown in FIG. 8, the gate 710 may have a radial hinge 740 so that it may be rotated as shown by the arrow 722 by an actuator 730 to permit automatic (or remote control) removal of debris. When the cyclonic air filter 100 (FIG. 1B) is operating, the bottom rotating plate 710 can be in a closed configuration (or position), as shown in FIG. 7. To empty the debris in the debris receptacle 170, the bottom plate or gate 710 can be opened, e.g., to a vertical position. In some embodiments the bottom plate or the gate 710 may be maintained in an open configuration and the debris is intermittently or continually removed by, for example, a dust collection system, such as a vacuum dust collection system (not shown). In the event that the dust collection system is not available, the gate 710 may be closed and the cyclonic air filter 100 operated until the dust collection system is available or connected to the port 720. An advantage of this embodiment is that maintenance can be conducted at a convenient time, also the time between maintenance cycles may be extended.

Figure 15:
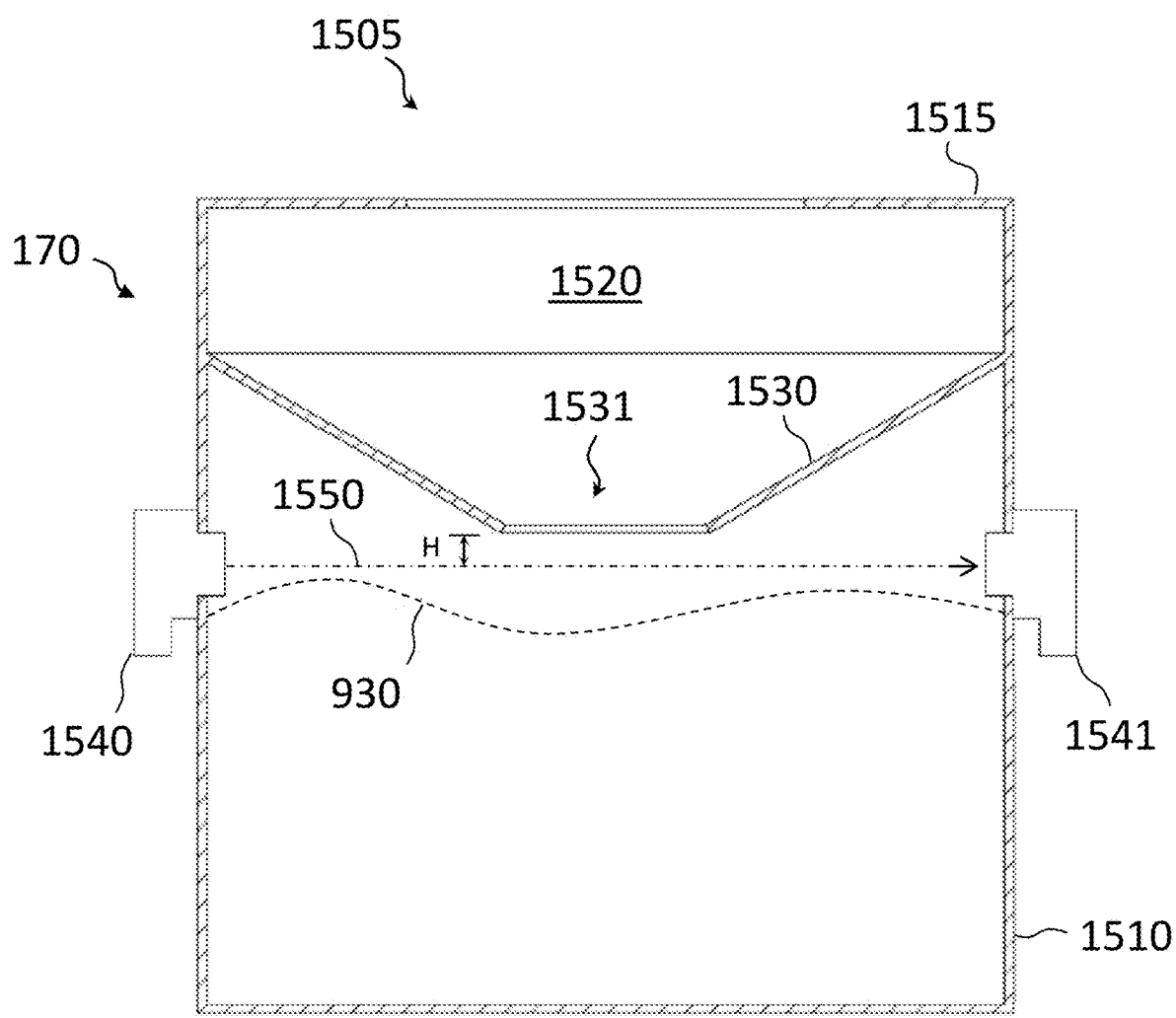
FIG. 15 is a cross-sectional side view of a debris receptacle of the cyclonic air filter, in accordance with embodiments of the present disclosure.

In some embodiments, as shown in FIG. 15, the debris receptacle 170 may be in the form of a removable can 1510, which may be removably attached to the bottom of the cone 105 (FIG. 4) of the cyclonic air filter 100. For example, a lid 1515 of the can 1510 may be fixedly or removably attached to the flange 404 (FIG. 4) on the bottom of the cone 105 removably attached to the base of the can 1510 with a clasp.

Figure 11:
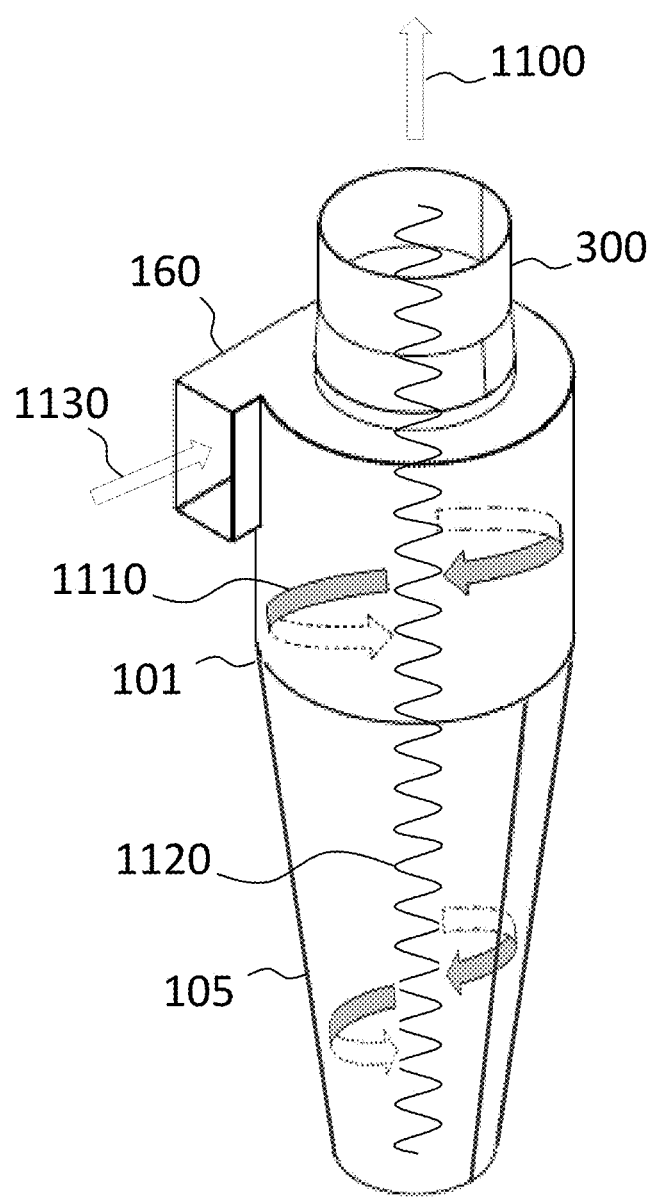
FIG. 11 is schematic diagram showing a direction of airflow in the cyclonic air filter, in accordance with embodiments of the present disclosure.

Referring to FIG. 4, the debris receptacle 170 may further comprise one or more baffles 430, 440, e.g., entrainment baffles, configured to prevent air circulation, in particular vertical airflow, from entering the debris receptacle 170 where the vertical airflow could entrain (or capture) debris from the debris receptacle and cause the vertical exiting air to contain debris from the receptacle 170. The baffles 440 have the effect of turning the filtered air stream to provide an ascending flow towards the outlet of the cyclonic air filter (as discussed more hereinafter with FIG. 11). Accordingly, the circular airflow is inhibited in the debris receptacle 170 by the baffles 440, preventing entrainment of captured debris in the exiting filtered airflow. As shown in FIG. 4, the debris receptacle 170 can comprise one or more horizontal baffles 430 and one or more vertical baffles 440. Any suitable number of vertical baffles 440 may be provided. For example, as shown in FIG. 4, a single horizontal baffle 430 and four vertical baffles 440 may be used. In some embodiments, the debris receptacle 170 comprises a single horizontal baffle, and may comprise several vertical baffles whose number is chosen for performance and manufacturing considerations, for example between 1 and 10 vertical baffles.

In a preferred embodiment, as shown in FIG. 15, the baffle has a frustoconical shape. The purpose of the baffle is to prevent the vortex from entering the debris receptacle so that debris, which is suspended in the vortex, drops into the debris receptacle. The vortex can be controlled using pressure, for example by having a baffle at the bottom of the cone with an opening sized to create a high pressure region that the vortex cannot penetrate, or by having the cone connected to a region having greater volume such that air flow slows down in the region of greater volume causing the entrained debris to fall. For example, a diameter of the opening 1505 is less than a diameter of the can 1510 such that the vortex from the cone cannot effectively enter the can. In some embodiments, a plate, such as the horizontal baffle 430 in FIG. 4 can be used. The horizontal baffle 430 and the vertical baffles 440 may each independently have any suitable shape, and may be rectilinear or curvilinear, and may be square, rectangular, circular, or a combination thereof. For example, as shown in FIG. 4, the horizontal baffle may have a circular shape. Also, the baffle can be curved. For example, the horizontal baffle may have a cupped shape. If desired, the horizontal baffle 430 or the vertical baffles 440, or both, may be omitted. A frustoconical baffle, e.g., wherein the concave surface faces the vortex, is preferred.

Figure 9:
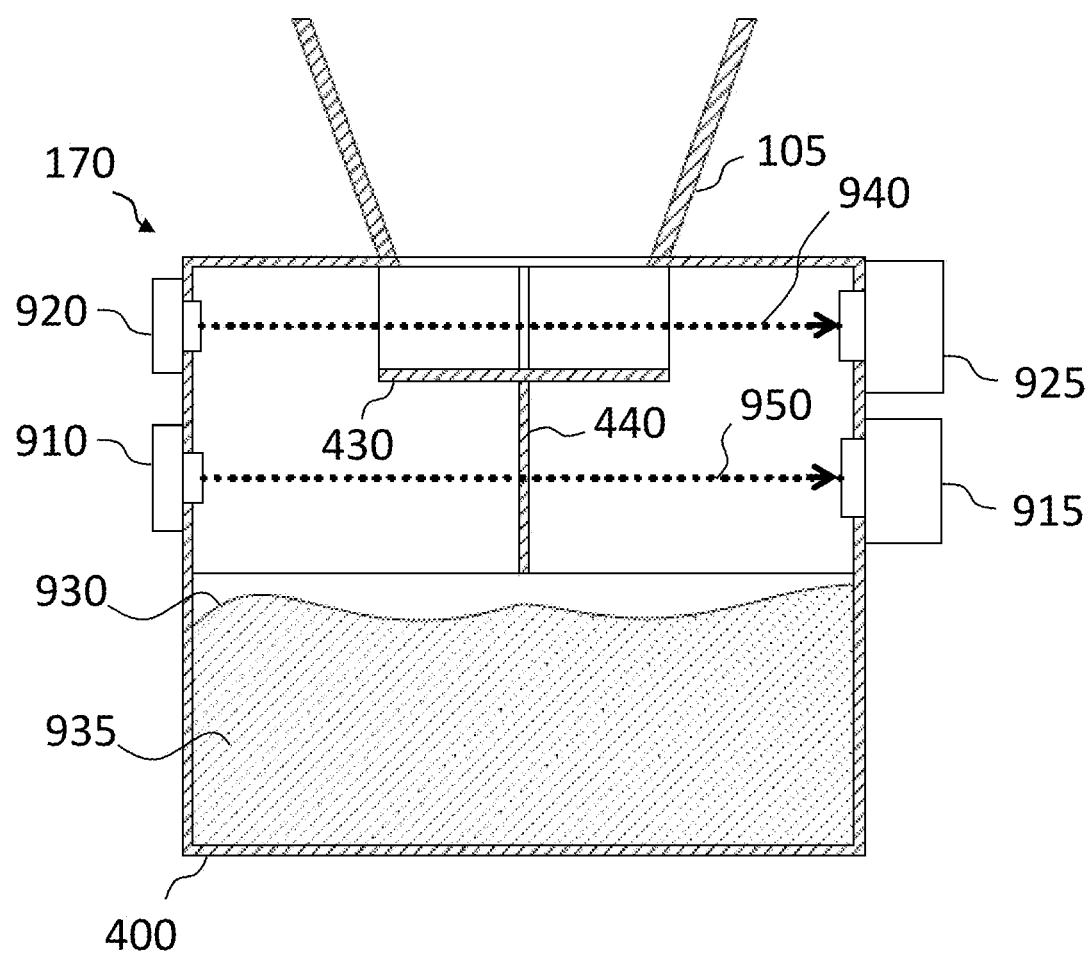
FIG. 9 is a cross-sectional diagram of an embodiment of a debris receptacle which includes a sensor in accordance with embodiments of the present disclosure.

Referring to FIG. 9, in some embodiments, a sensor(s) or sensor set 920,925 or 910,915, may be provided on the debris receptacle 170 to sense a debris 935 content level 930 in the debris receptacle 170. The sensor set 910,915, may be collectively referred to herein as the sensor (or sensor set) 910, and the sensor set 920,925 may be collectively referred to as the sensor (or sensor set) 920. Any suitable type of sensor(s) or sensor sets may be used. The sensors 920,925 or 910,915, may be an optical break beam sensor, a capacitive sensor, an admittance level sensor such as a radio frequency admittance level sensor, a vibration sensor, or a rotating paddle sensor, for example. In particular, the sensors 920, 925 or 910,915, may be optical break-beam sensors. A plurality of sensors (or sensor sets) may be used. More specifically, the debris receptacle 170 may comprise a first sensor (or sensor set) 910,915 and a second sensor set 920,925, where the first sensor set 910,915 may comprise a transmitter 910 and a corresponding receiver (or collector) 915, and the second sensor set 920,925 may comprise a second transmitter 920 and a second corresponding receiver (or collector) 925.

The first sensor set 910,915 may be configured to sense a first debris content level and the second sensor set 920,925 may be configured to sense a second debris content level of the debris 930 which can be trapped in the debris receptacle 170. The first debris content level and the second debris content level can be the same, e.g., to provide redundancy, or can be different, e.g., to provide different alarm levels. For example, the first sensor set 910,915 can be configured to sense a debris content of e.g., about 30% to 60%, 35% to 55%, or 40% to 50%, and the second sensor can be configured to sense a debris content of e.g., about 70% to 100%, 75% to 95%, or 80% to 90%, wherein each debris content level is based on a total debris capacity of the debris receptacle 170.

In some embodiments, the debris content level may be measured by volume, and the first sensors 910,915 can be configured to sense a debris content of e.g., about 30 volume percent (vol %) to 60 vol %, 35 vol % to 55 vol %, or 40 vol % to 50 vol %, and the second sensor can be configured to sense a debris content of, e.g., about 70 vol % to 100 vol %, 75 vol % to 95 vol %, or 80 vol % to 90 vol %, based on a total volume of the debris receptacle. Alternatively, the debris content can be measured by weight or dwell time. In an embodiment, the first sensor can be configured to sense a debris content of, e.g., about 30 weight percent (wt %) to 60 wt %, 35 wt % to 55 wt %, or 40 wt % to 50 wt %, and the second sensor can be configured to sense a debris content of, e.g., about 70 wt % to 100 wt %, 75 wt % to 95 wt %, or 80 wt % to 90 wt %, based on a total debris weight capacity of the debris receptacle. Alternatively, the sensors may be configured to sense time, and the first sensors can be configured to sense a debris content of e.g., about 30 percent (%) to 60%, 35% to 55%, or 40% to 50%, and the second sensor can be configured to sense a debris content of 70% to 100%, 75% to 95%, or 80% to 90%, based on a selected total time, wherein the total time can be about 1 hour to 10,000 hours, 2 hours to 5,000 hours, or 4 hours to 2,500 hours, or 8 hours to 1,200 hours.

Shown in FIG. 10A-10D is an embodiment of a circuit 1000 for at least one of the sensor sets and an alarm, which may be actuated when a selected debris content (or content level) in the debris receptacle 170 is sensed. A plurality of alarms may be used. For example, a first alarm may be actuated when the first debris content level is sensed, and a second alarm may be actuated when the second debris content level is sensed. The alarm may have any suitable form, and may be optical, audible, or combination thereof. In some embodiments, the alarm may be integrated with the operation of another device, for example configured to shut down the other device if the debris content of the debris receptacle is above a selected level. In some embodiments, the alarm may be integrated with a control system of the burner 159 (FIG. 1A), such as a control system of a packaged burner, or a heating system control system, such as the control system of a fluid heating system, so that the system may be automatically configured to permit emptying of the debris, or automatically shut down to avoid damage in the event a debris content is greater than a selected content.

The premise of the sensor circuit 1000 is that when enough contaminants accumulate in the contaminant bin an infrared (IR) light beam will be broken (or interrupted), which will set off a series of events resulting in a notification alarm if the time period of the light beam interruption is sufficiently long.

Figure 10A:
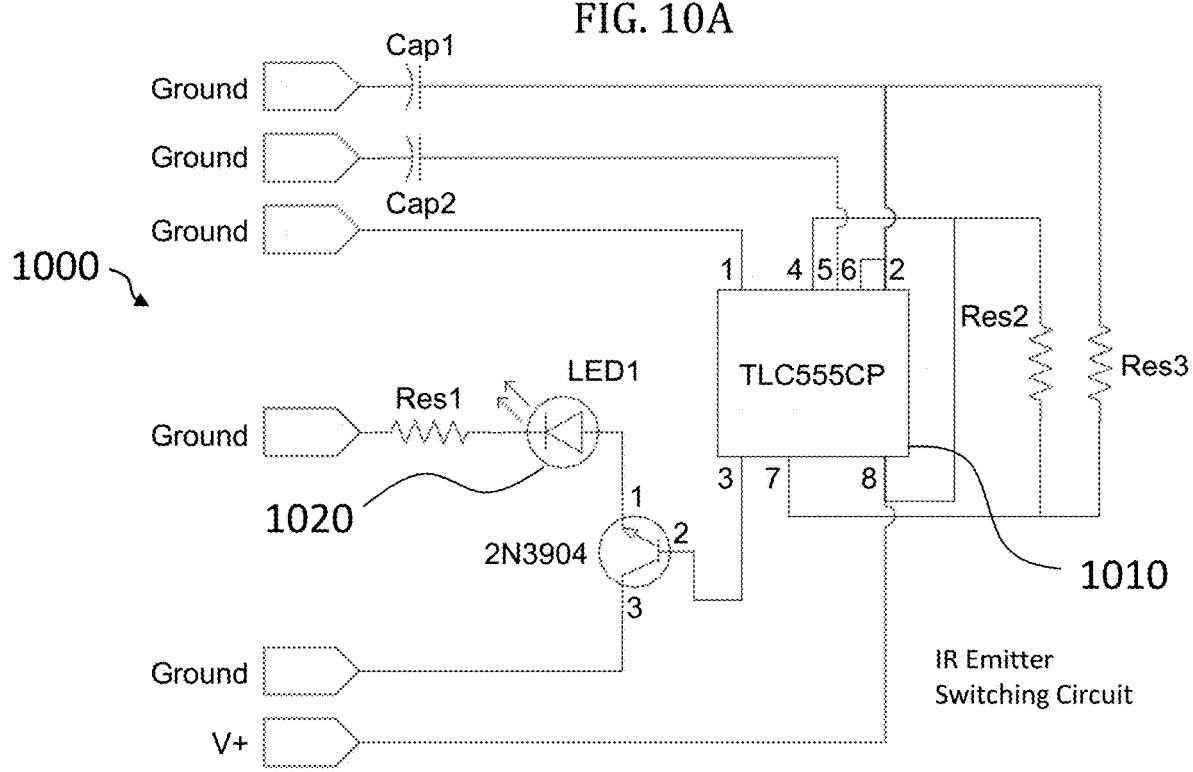
FIGS. 10A, 10B, 10C, and 10D is a schematic circuit diagram of an embodiment of a sensor circuit to indicate the maximum debris level has been exceeded, in accordance with embodiments of the present disclosure.

Referring to FIG. 10A, the circuit 1000 shows an emitter (or transmitter) LED 1020 having a frequency determined by a timer or clock chip or integrated circuit 1010, such as part no. TLC555CP, made by Texas Instruments, Inc. This is the frequency at which an infrared (IR) collector (or receiver) 1030 in FIG. 10D is designed to respond.

Figure 10B:
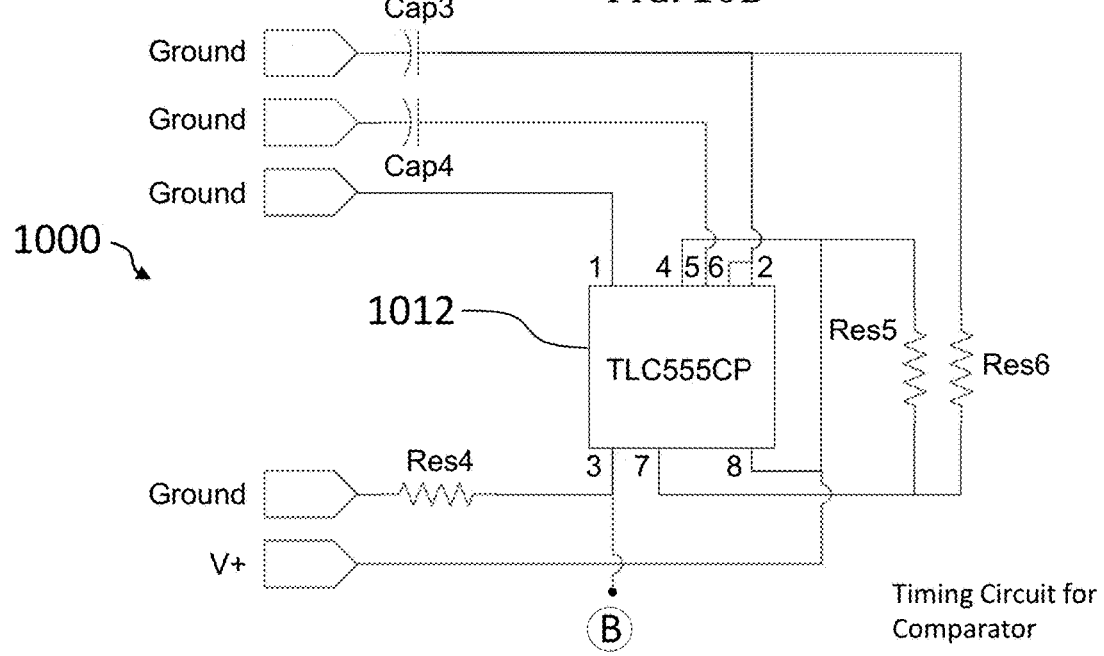

Referring to FIG. 10B, another portion of the circuit 1000 shows a timing circuit using a similar timer or clock chip 1012 as the chip 1010, that does not include an IR emitter, used as a basis to compare the number of clock cycles during the light beam interruption as a means for determining the duration of the light beam interruption.

Figure 10C:
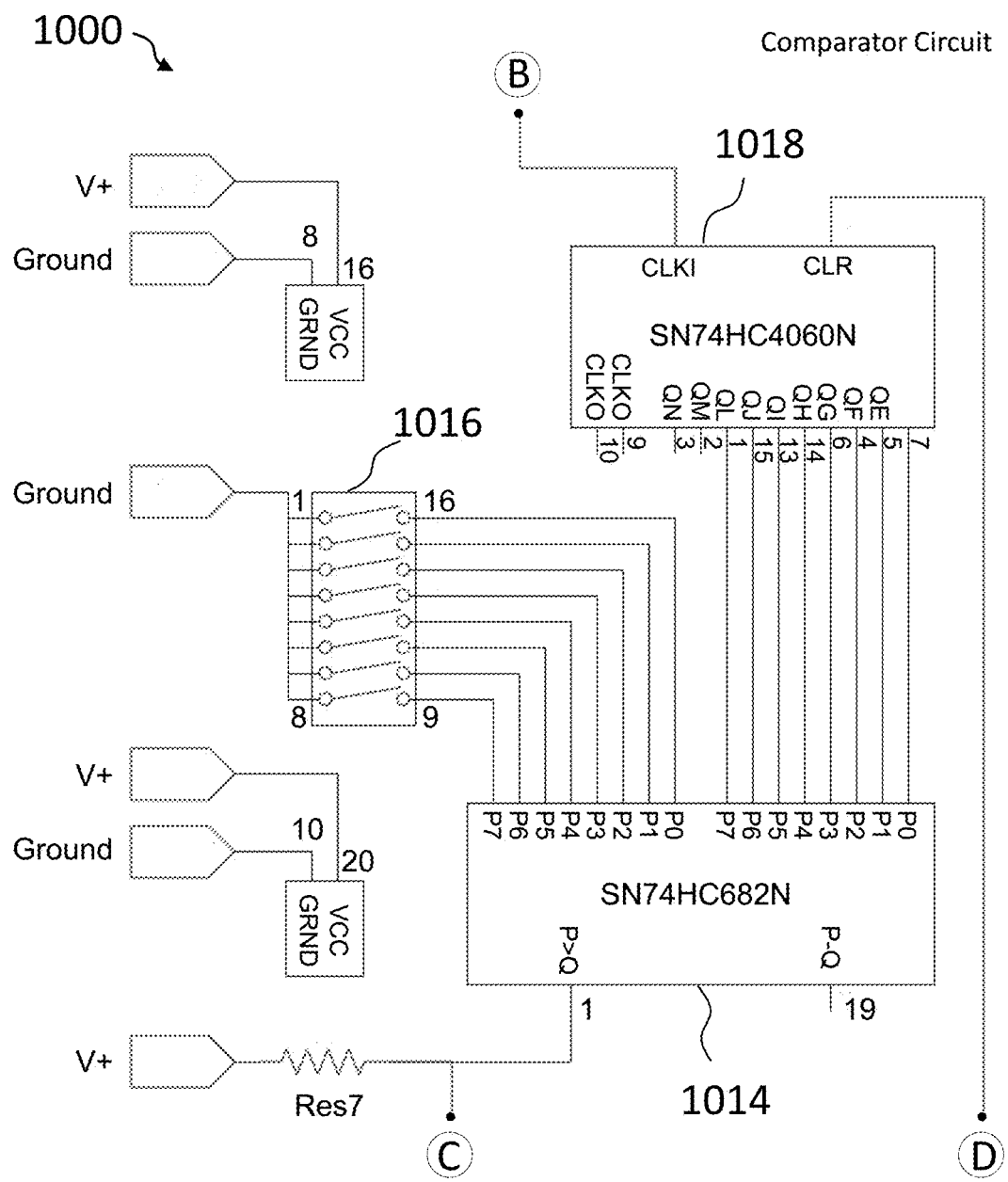

Referring to FIG. 10C, another portion of the circuit 1000 shows a circuit consisting of a logical comparator chip 1014, e.g., part no. SN74HC682N, made by Texas Instruments, Inc., which compares the number of clock cycles corresponding to the interruption of the light beam reception sent by the emitter 1020 to the collector 1030 to the running clock signal produced by the second clock chip 1012 and a binary counter chip 1018, e.g., part no. SN74HC4060N, made by Texas Instruments, Inc. Once the time period of interruption (from the binary counter chip 1018) exceeds a value set by a DIP switch bank 1016, an alarm state is triggered by the comparator chip 1014.

Figure 10D:
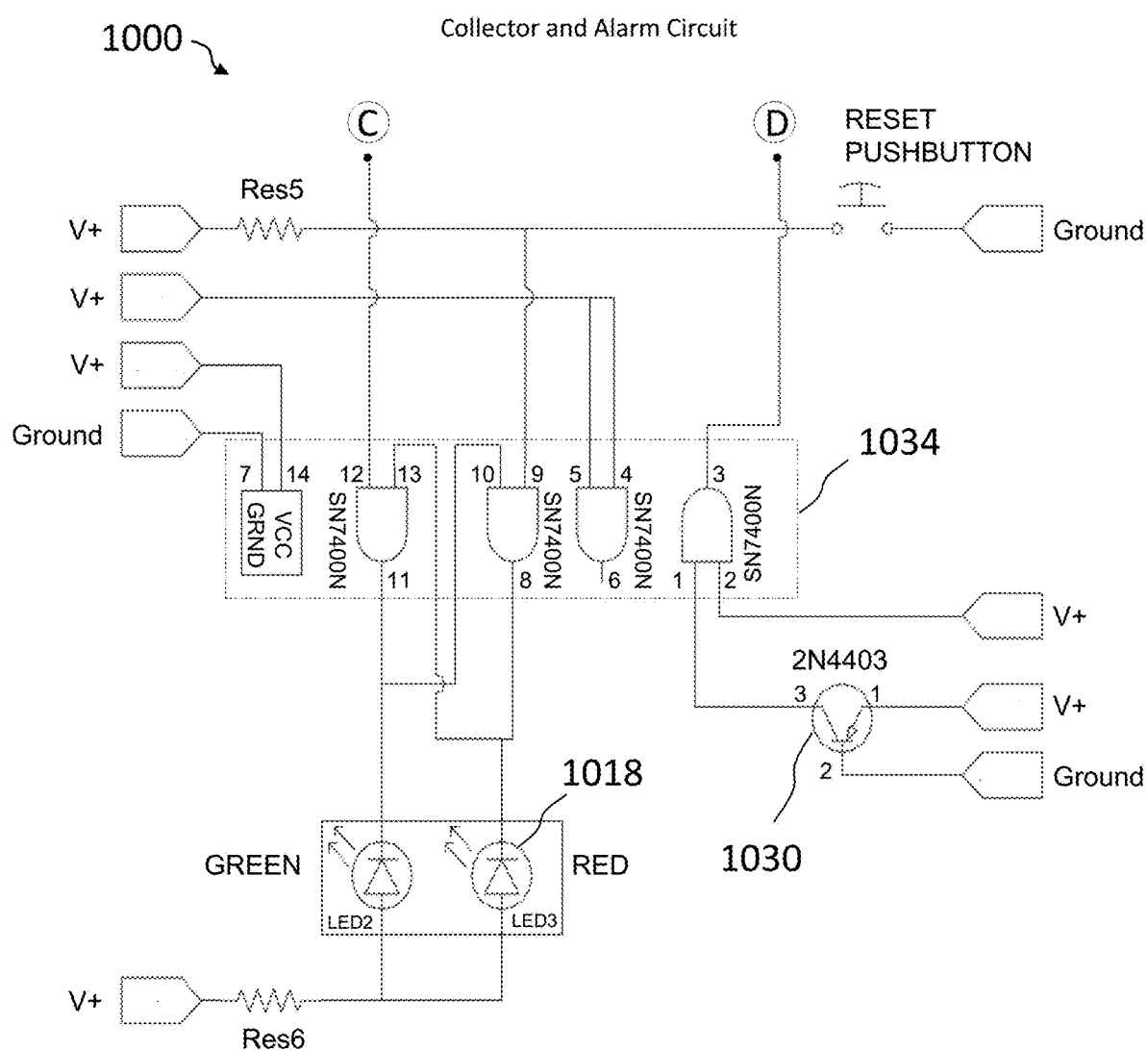

Referring to FIG. 10D, another portion of the circuit 1000 shows the collector (or receiver) 1030, various logic gates 1034, and alarm circuit having the red alarm LED3 1018. Once the comparator 1014 (FIG. 10C) triggers the alarm state, a visible Red LED 1018 is activated, notifying the operator that the debris receptacle 170 requires maintenance. When there is no alarm state the Green LED2 is illuminated, indicating that the debris receptacle 170 does not require maintenance.

In some embodiments, the alarm may be an audible alarm and/or a visual alarm. The circuit 1000 may also transmit the alarm electronically via a computer network, wired or wireless, to one or more devices, such as a mobile communication device (e.g., a smart phone or equivalent), a desktop or laptop computer or tablet or the like, which alerts an operator of the system to take corrective action. Also, any other circuit configuration or sensors may be used if desired, provided they provide the same or similar function and/or performance to that disclosed herein. For example, instead of using discrete circuit components, the sensor signals may be provided to a microprocessor, gate array, programmable logic device, or other computing device that determines when an optical signal interruption occurs and sets an alarm and/or sends a message, e.g., email, text, or other electronic wired or wireless communication signal or message, via a computer network or otherwise, to alert the operator of the alarm. In that case, the computer may also take specific corrective or protective action based on the type of event, including shutting down the burner or the entire system.

Figure 10E:
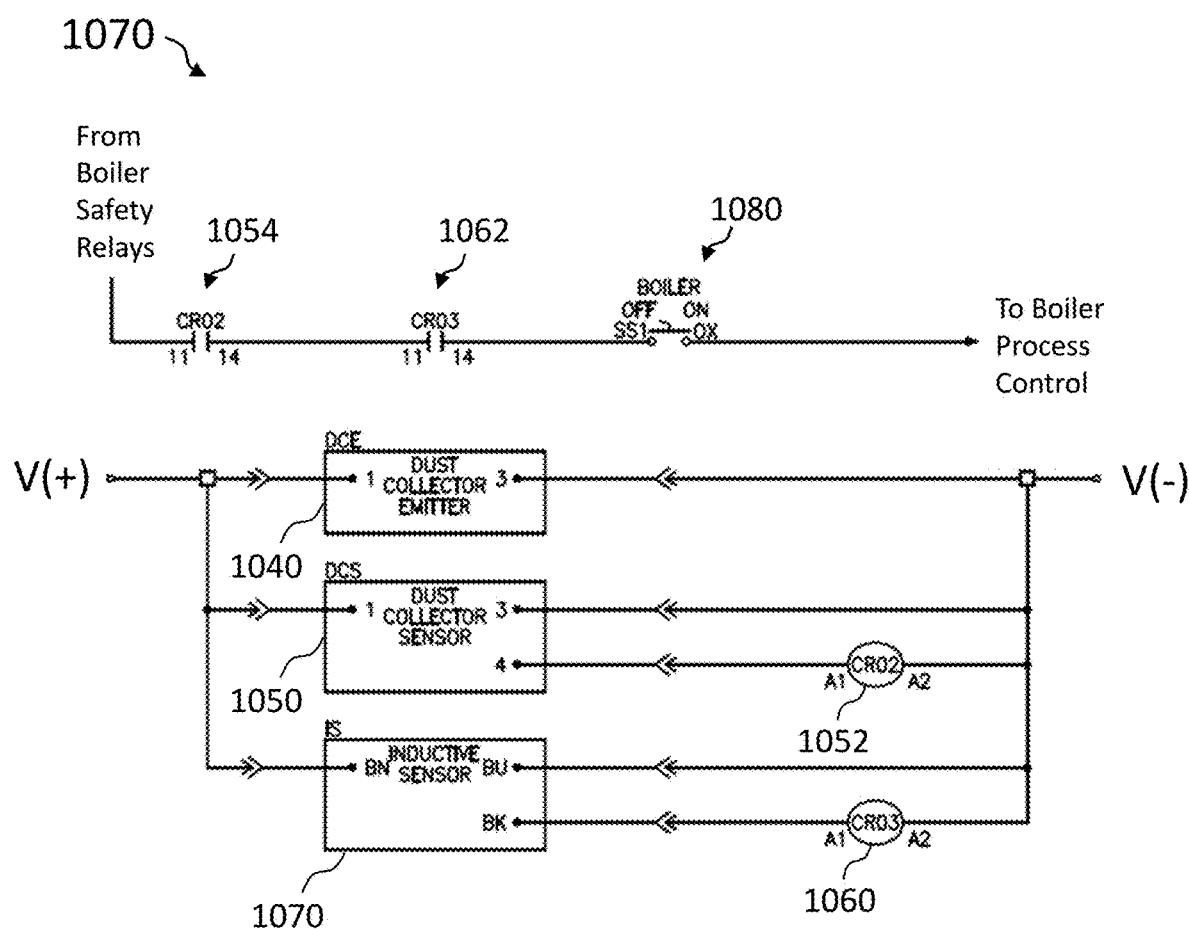
FIG. 10E is a schematic circuit diagram of a another embodiment of a sensor circuit to indicate the maximum debris level has been exceeded, in accordance with embodiments of the present disclosure.

FIG. 10E shows another embodiment of a sensor circuit 1070 for notifying an operator that the debris receptacle requires maintenance and interrupting the operation of the boiler until maintenance is complete. In some embodiments, an emitter (or transmitter) circuit 1050 sends an IR light beam that is received by an IR collector (or receiver) circuit 1050. When the IR light beam is uninterrupted, a relay CR02, having a relay coil 1052 and a corresponding relay switch 1054, where the relay switch 1054 is normally closed, providing power to the system. When the IR beam is interrupted, the relay switch 1054 opens, e.g., cutting power to the system, and setting off a visual or auditory alarm (not shown) and, possibly, activating other boiler protection circuits. For example, the open relay switch 1054 state may prevent the operation of the boiler until maintenance is complete by signaling the boiler control system in concert with other protection circuits like inductive sensors 1070, and corresponding relay coil 1060 and relay switch 1062 (for relay CR03), that indicate when the boiler should remain inactive for safety or performance considerations.

In some embodiments, the sensor may be configured so that when the beam is not obstructed, a circuit is inactive, and when the beam is obstructed the circuit is triggered.

In further detail, the receiver can be in a "high" state when the emitter beam is obstructed, actuating an alarm, such as a lighted indicator. Also, when the beam is no longer obstructed, the circuit can automatically reset the alarm, e.g., turning off a lighted indicator. The circuit can also be used to trigger auxiliary functions, such as shutting down other equipment or components. One instance of the circuit 1000 shown in FIG. 10A through FIG. 10D can be provided for each emitter-receiver pair (or sensor set, as discussed herein with FIG. 9). In some embodiments, wherein a plurality of sensors (or sensor sets) are used, a different action (or sequence of actions) can be taken when the light beam corresponding to each sensor is obstructed; for example, a notification may be actuated, e.g., actuating a light or sending a message to a receiver such as cellular telephone, when the accumulated debris reaches a threshold selected for the sensor.

Figure 12A:
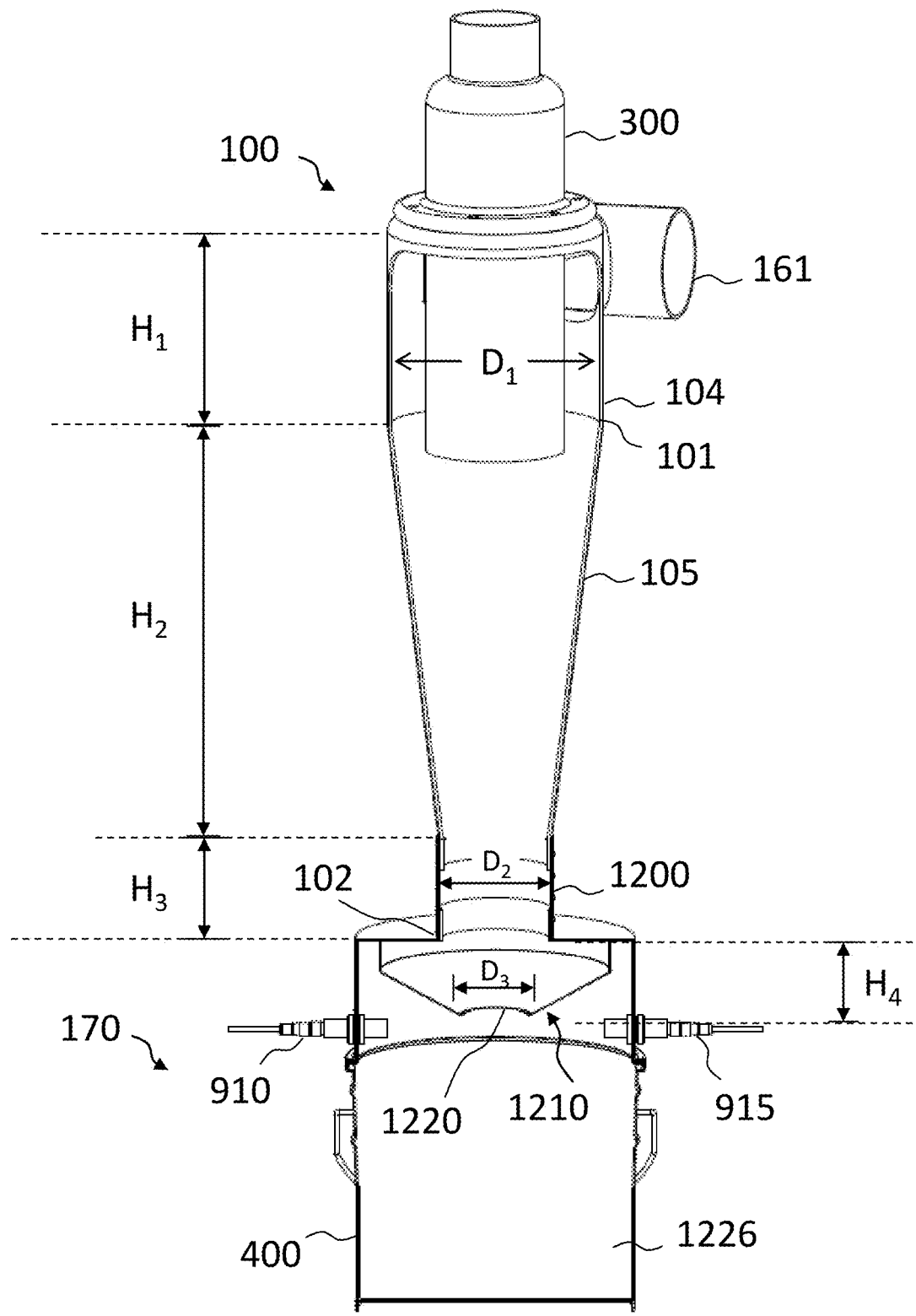
FIG. 12A is a longitudinal partial cut-away perspective view of another embodiment of the cyclonic air filter with a flash chamber, in accordance with embodiments of the present disclosure.
Figure 12B:
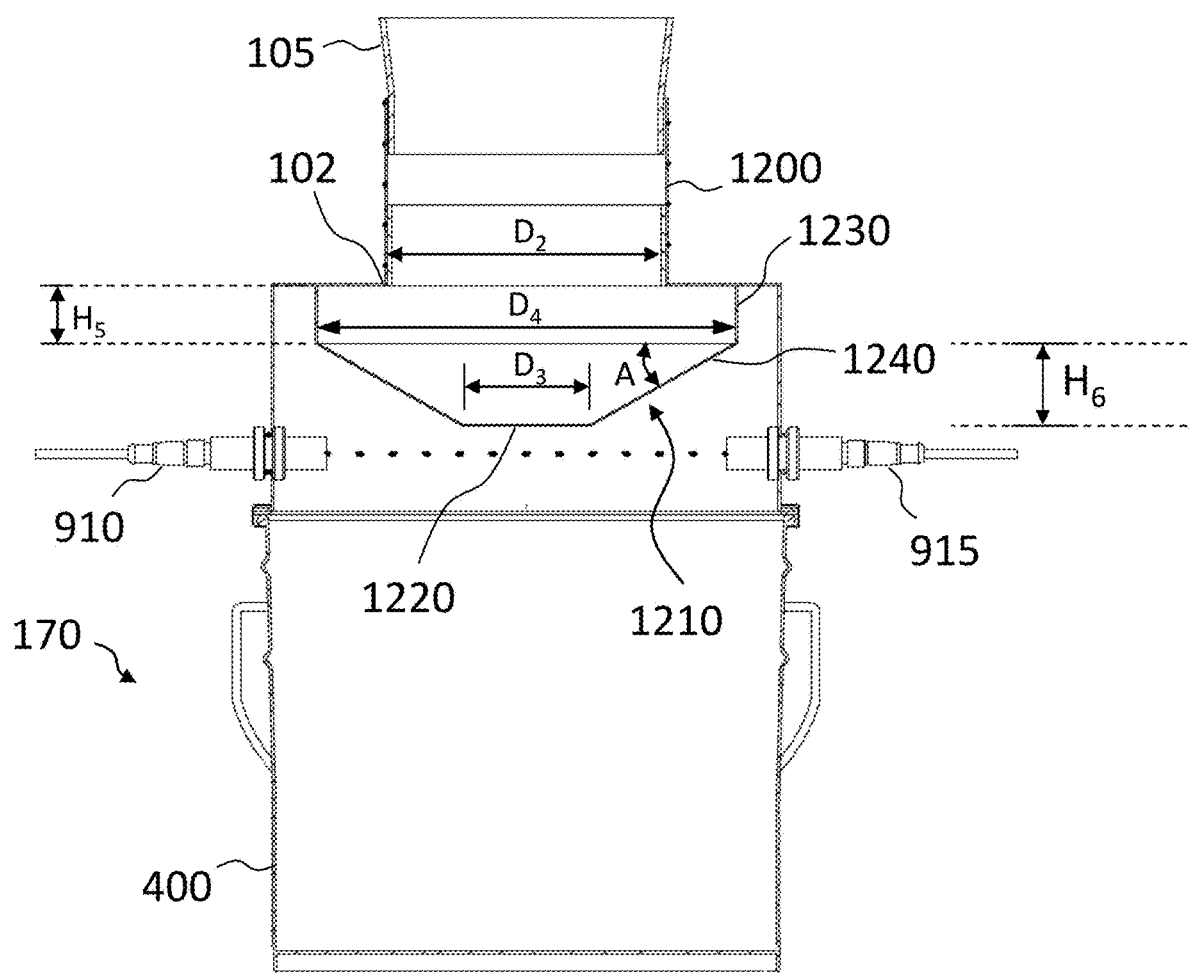
FIG. 12B is a side cross-sectional view of debris receptacle showing a flash chamber, in accordance with embodiments of the present disclosure.

Referring to FIGS. 12A and 12B, in some embodiments, the debris receptacle 170 may comprise a flash chamber 1210 configured to support the turn-about of the clean airstream flow while preventing re-entrainment of debris that has been previously separated from reentering the clean airstream. In FIG. 12A, airflow passes into the air filter inlet 161 into the body of the cyclonic air filter 100. The body of the cyclonic air filter 100 may be composed of one or more sections, such as a cylindrical first section (or barrel) 104 disposed on a conical (or cone) second section 105 disposed on a cylindrical third section 1200 that connects the filter body to the debris receptacle 400 at an interface or joint 102. The diameter of the first cylindrical section $D_1$ may be in the range between about 1 centimeters (cm), or 2 cm, or 3 cm, or 4 cm, or 5 cm and about 80 cm, or 90 cm, or 100 cm, or 110 cm, or 120 cm, or 130 cm, or any combination thereof. The range about 2 cm to 120 cm provides desirable performance; however, other values may be used if desired.

The height of the first cylindrical section, $H_1$, may be in the range between about 1 centimeters (cm), or 2 cm, or 3 cm, or 4 cm, or 5 cm and about 80 cm, or 90 cm, or 100 cm, or 110 cm, or 120 cm, or 130 cm, or any combination thereof. In particular, we have found that the range of about 2 cm to 120 cm provide desirable performance; however other values may be used if desired. Also, the height $H_1$ may be approximately equal to the diameter $D_1$ and is a relationship that has been empirically determined to be effective for the present disclosure to provide desirable performance; however, other values and relationships may be used if desired.

The height $H_2$ of the second section in a conical shape may be in the range between about 1 cm, or 2 cm, or 3 cm, or 4 cm, or 5 cm or 10 cm and 50 cm, or 100 cm, or 150 cm, or 200 cm, or 250 cm, or 300 cm, or any combination thereof. We have found that the range about 5 cm to 250 cm provides desirable performance; however, other values may be used if desired. Also, the height $H_2$ may equals approximately two (2) times $D_1$ and a relationship that has been empirically determined to be effective to provide desirable performance; however, other values and relationships may be used if desired.

The height of the third section $H_3$ may be in the range between about 1 centimeters (cm), or 2 cm, or 3 cm, or 4 cm, or 5 cm and about 80 cm, or 90 cm, or 100 cm, or 110 cm, or 120 cm, or 130 cm, or any combination thereof. We have found that the range about 2 cm to 120 provides desirable performance; however, other values may be used if desired. Also, the height $H_1$ may equals approximately $D_1$ and is a relationship that has been empirically determined by the inventors to be effective to provide desirable performance; however, other values and relationships may be used if desired.

The diameter $D_2$ of the third section 1200 may be in the range between about 1 centimeters (cm), or 2 cm, or 3 cm, or 4 cm, or 5 cm and about 80 cm, or 90 cm, or 100 cm, or 110 cm, or 120 cm, or 130 cm, or any combination thereof. We have found the range of about 2 cm to 120 cm to provide desirable performance; however, other values may be used if desired. Also, the diameter $D_2$ may equal approximately one-half $D_1$ and is a relationship that has been empirically determined to be effective to provide desirable performance; however, other values and relationships may be used if desired.

Other values and relationships may be used if desired for the parameters discussed herein, provided the resulting device exhibits similar function and/or performance characteristics to that discussed herein.

The embodiment incorporates a flash chamber 1210 that, like the entrainment baffles 430,440 discussed hereinbefore with FIG. 4, provides a cavity where the vertical air flow 1100 (FIG. 11) can expend its rotational energy, reverse direction and shed the trapped debris before proceeding back up the center of the air filter to the outlet 300. The flash chamber 1210 is contained within the debris receptacle housing 400 with an air inlet 1220 at the interface 102 with the bottom of cyclonic air filter body 1200 and an outlet 1220 that opens into the debris receptacle collection cavity 1226. The emitter (or transmitter) 910 and collector 915 sensor system (or sensor set) may be disposed on the debris receptacle 170 to monitor the height of the collected debris and notify an operator when the height of the debris is close enough to the flash chamber to risk reentrapment of the debris into the rising clean air stream, as discussed herein.

The diameter of the flash chamber air outlet, $D_3$, may be in the range between about 1 centimeters (cm), or 2 cm, or 3 cm, or 4 cm, or 5 cm and about 10 cm, or 20 cm, or 30 cm, or 40 cm, or 50 cm, or 60 cm, or 70 cm, or 80 cm, or 90 cm, or 100 cm, or 110 cm, or 120 cm, or 130 cm, or any combination thereof. We have found the range of about 1 cm to 40 cm to provide desirable performance; however, other values may be used if desired. Also, the diameter $D_2$ may equal approximately one-fourth $D_1$ and is a relationship that has been empirically determined by the inventors to be effective to provide desirable performance; however, other values and relationships may be used if desired.

In a preferred embodiment, the flash chamber 1210 may comprise two sections: a cylindrical section 1230 and a frustoconical section 1240 that opens into the debris receptacle. The diameter of the flash chamber cylindrical section 1240 must be greater than or equal to $D_2$, the diameter of the outlet of the third air filter section, and fit within the debris receptacle housing 400. The height $H_5$ of the flash chamber cylindrical section 1230 may be in the range between about 1 centimeters (cm), or 2 cm and about 3 cm, or 4 cm, or 5 cm and about 6 cm, or 7 cm, or 8 cm, or 9 cm, or 10 cm, or 20 cm, or 30 cm, or 40 cm, or 50 cm, or 75 cm, or 100 cm, or any combination thereof. The range about 1 cm to 20 cm is specifically mentioned.

The height $H_6$ of the flash chamber frustoconical section 1240 is geometrically determined by the diameter $D_4$ of the flash chamber cylindrical section 1230, the frustoconical section 1240 outlet diameter $D_3$ and the angle A between the lower angled wall of the frustoconical section 1240 and the upper horizontal boundary of the frustoconical section 1240. In particular, $H_6$ may be computed as shown by Eq. 1 below:

$$H_6=(0.5*D4-0.5*D3)*\text{Tan}(A) \qquad \text{Eq. 1}$$

The angle A may be in the range between about 1 degree (deg), or 2 deg and about 3 deg, or 4 deg, or 5 deg and about 10 deg, or 20 deg, or 30 deg, or 40 deg, or 50 deg, or 60 deg, or 70 deg, or 80 deg, or 90 deg, or any combination thereof. The range of about 1 deg to 60 deg is specifically mentioned. The angle A of approximately 30 deg is also specifically mentioned and is a value that has been empirically determined by the inventors to be effective to provide desired performance; however, other angles may be used if desired.

The blower 110 may be disposed upstream or downstream of the cyclonic air filter 100, wherein upstream and downstream are relative to a direction of airflow. In a preferred embodiment, as shown in FIGS. 1A and 1B, the cyclonic air filter 100 is upstream of the blower 110, and the cyclonic air filter 100 can be connected to an inlet 111 of the blower 110.

The combustible gas supply system may further comprise a burner 150, which is in fluid communication with the blower 110, to provide a combustion gas supply system. The burner 150 is downstream of the cyclonic air filter 100 so that the cyclonic air filter 100 can filter the burner inlet air. Any suitable burner can be used. The burner 150 can be a direct fired burner, such as a baffle burner or an air staged burner, or an indirect fired burner. The burner 150 may be a packaged burner, e.g., a burner and control system assembly, optionally including a blower. A mesh burner as shown in FIG. 2, wherein the burner comprises a mesh 151, is specifically mentioned. In some embodiments, the power rating (typically in BTU/hour) of the burner 150 may be about $1 \times 10^5$ to about $5 \times 10^7$ BTU/hr. Other burner ratings may be used if desired.

In an embodiment, the combustible gas supply system further comprises a first conduit 130, which connects the cyclonic air filter 100 and the blower 110, and optionally a second conduit 140, which connects the blower 110 and the burner 150. The first conduit and/or the second conduit may be omitted if desired. In an embodiment, the cyclonic air filter 100 may be directly connected to the blower 110, e.g., the blower 110 may be directly on the cyclonic air filter 100. Also, the blower 110 may be directly on the burner 150, if desired.

The combustible gas (or fuel) inlet 120 may be disposed upstream of the cyclonic air filter 100, between the cyclonic air filter 100 and the blower 110, between the blower 110 and the burner 150, or combination thereof. In a preferred embodiment the combustion gas inlet 120 is between the cyclonic air filter 100 and the blower 110. In yet another embodiment the combustible gas inlet 120 is between the blower 110 and the burner 150.

The combustible gas (or fuel) inlet 120 may be disposed on the first conduit 130, as shown in FIGS. 1B and 2, and may be disposed on the second conduit 140, or on a combination thereof. In yet another embodiment, the combustible gas inlet 120 is disposed on the cyclonic air filter 100, and in yet another embodiment the combustible gas inlet 120 is disposed on the blower 110. An embodiment in which the combustible gas inlet 120 is disposed on the first conduit 130 is preferred.

Also disclosed is a fluid heating system comprising: a combustion gas supply system comprising a cyclonic air filter, a blower having an inlet and an outlet, a combustible gas inlet, and a burner, wherein the cyclonic air filter, the blower, the combustible gas inlet and the burner are in fluid communication; and a heat exchanger, wherein the heat exchanger is in fluid communication with the burner. Any suitable heat exchanger may be used. The heat exchanger may be a shell and tube heat exchanger, a plate heat exchanger, a plate and shell heat exchanger, an adiabatic wheel heat exchanger, or a plate fin heat exchanger. The heat exchanger may be a tube heat exchanger or a tubeless heat exchanger. A heat exchanger as disclosed in U.S. patent application Ser. Nos. 14/949,948 and 14/949,968, and International Application No. PCT/US15/65279, the contents of which are incorporated herein by reference in their entirety, may be used.

The cyclonic air filter, the blower, the combustible gas inlet, and the burner may comprise any suitable material, and may comprise a metal, a polymeric material, or a combination thereof. Use of a steel, such as mild steel is specifically mentioned. In a preferred embodiment the cone, barrel, inlet, and outlet of the cyclonic air filter comprise a polymeric material. The polymeric material is preferably sufficiently conductive to dissipate static electricity.

Representative polymeric materials include a polyolefin, such as a homopolymer or a copolymer of a monoolefin or a diolefin, for example polypropylene ("PP"), or polyethylene ("PE") which optionally can be crosslinked and can be, for example, high density polyethylene ("HDPE"), low density polyethylene ("LDPE"), linear low density polyethylene ("LLDPE"), branched low density polyethylene ("BLDPE"), a polymer of a cycloolefin ("COC"), for example of cyclopentene or norbornene, a polystyrene such as high-impact polystyrene ("HIPS"); a polymer derived from an $\alpha,\beta$-unsaturated acid which is obtained by polymerizing the unsaturated bond in positions $\alpha$ and $\beta$ relative to the acid functionality, such as a polyacrylate, a polymethacrylate, a polyacrylonitrile, a polyacrylamide, or a polymethyl methacrylate impact-modified with a butyl acrylate polyamide; a polymer derived from an unsaturated alcohol and an amine or an acyl derivatives or acetal thereof, such as polyvinyl alcohol, polyvinyl acetate, polyvinyl stearate, polyvinyl benzoate, polyvinyl maleate, polyvinyl butyral, polyallyl phthalate or polyallylmelamine, a polyurea, a polyimide, a polyamide-imide, or polybenzimidazole; a polyester, i.e. a polymerization product of a dicarboxylic acid such phthalic acid, isophthalic acid, or terephthalic acid and a difunctional or polyfunctional alcohol such as ethylene glycol, propylene glycol, or other diol or polyol derived from an alkane, such as polyethyleneterephthalate ("PET") or polybutylene terephthalate ("PBT")), poly-1,4-dimethylolcyclohexane terephthalate, or a polyhydroxybenzoate; a polyamide ("PA") or a copolyamide derived from a diamine and a dicarboxylic and/or polycarboxylic acid and/or from an aminocarboxylic acid or the corresponding lactam, such as polyamide 4, 6, 6/6, 6/10, 6/9, 6/12, 4/6, 12/12, 11, or 12, an aromatic polyamide starting from m-xylene, diamine, or adipic acid; or a polyamide prepared from hexamethylenediamine and isophthalic and/or terephthalic acid without an elastomer as modifier, for example poly-2,4,4-trimethylhexamethylene terephthalamide or poly-m-phenylene isophthalamide; a polycarbonate; a polyurethane ("PUR") derived from a hydroxyl-terminated polyether and/or polyester and an aliphatic or aromatic polyisocyanate, and also precursors thereof; a polyether, i.e. a polymerization product of a cyclic ether, such as a polyalkylene glycol, a polyethylene oxide, a polypropylene oxide ("PPO"), a polyacetal, or a polyethersulfone, or a halogen-containing polymer, such as polychloroprene, chlorinated rubber, chlorinated or sulphochlorinated polyethylene, a copolymer of ethylene and chlorinated ethylene, an epichlorohydrin homopolymer including a polymer of a halogen-containing vinyl compound, for example polyvinyl chloride ("PVC"), polyvinylidene chloride, polyvinyl fluoride, or polyvinylidene fluoride. A combination comprising at least one of the foregoing can be used. Also, the polymeric material may further comprise a filler. The filler may be selected to provide sufficient conductivity, e.g., sufficient electrical conductivity to dissipate static electricity. Representative fillers include silica, carbon, aluminosilicates, clays, and zeolites. A polymeric material comprising carbon is specifically mentioned.

Also disclosed is a method of producing a combustible gas, the method comprising: directing air with the blower through the cyclonic filter to produce filtered air; and mixing the filtered air with a fuel to form a combustible gas. The filtering is further disclosed in FIG. 11, which shows the direction of airflow in the cyclonic air filter 100. The airflow follows the path indicated by the arrows 1130,1110,1120, 1100 in FIG. 11. The air 1130 enters the inlet 160 and follows a downward helical path 1110 and descends along an inner surface of the body 101. When descending the cone 105, the airflow accelerates as it descends along the inner surface of the cone because of the narrowing diameter. Under the action of the resulting centrifugal acceleration, airborne particulate debris is forced away from the longitudinal axis 310 (FIG. 3) of the body of the cyclonic air filter 100 and drops under the action of gravity into the debris receptacle 170. The embodiments shown herein show the cyclonic air filter 100 oriented vertically with respect to the longitudinal axis 310 of the body 101. While gravity is important in driving the migration of debris particles into the debris receptacle, the cyclonic air filter 100 will operate effectively if the body of the cyclonic air filter 100 is oriented within an angle of departure between 0 degree and about 20 degrees from vertical. Other non-vertical angles may be used if desired; however, the filterint (or separation) performance may be reduced. The filtered airstream 1100 is prevented from penetrating the debris receptacle 170 (FIG. 1B) by hydrodynamic pressure, and the vertical filtered airstream reverses direction at the base of the conical section 105 and rises along the longitudinal axis 310 (FIG. 3) of the body of the cyclonic air filter 100 in a rising helical airflow 1120 and exits the cyclonic air filter 100 through the outlet 103 (FIG. 1B).

In the embodiment shown in FIG. 1B, the airflow is drawn under a vacuum provided by the blower 110 through the cyclonic air filter 100, and pushes the filtered airstream with a positive pressure to the burner 150, if present. If desired, the airflow may be routed through a conduit, such as a first conduit 130 (between the air filter 100 and the blower 110) and a second conduit 140 (between the blower 110 and the burner 150), as shown in FIG. 1B. The blower 110 and cyclonic air filter 100 are further disclosed herein, and thus further description of the blower 110 and cyclonic air filter 100 are not repeated for clarity. Any suitable fuel may be used to provide the desired combustion results. Representative fuels include natural gas, methane, hydrogen, diesel, kerosene, gasoline, coal gas, or combination thereof. Natural gas is specifically mentioned.

As is further disclosed above, an advantage of the disclosed system is that it can provide filtered air having improved pressure stability. In an embodiment, a maximum pressure and a minimum pressure of the filtered air are both within 5%, 0.01% to 5%, 0.1% to 4%, or 0.2% to 3% of an average pressure of the filtered air, or within 0.001%, 0.01%, 0.1%, or 0.2% to 5%, 4%, 3%, or 1%, of an average pressure of the filtered air, wherein the average pressure is determined over 1 to 500 hours, preferably 250 hours, and wherein the upper and lower bounds may be independently combined. In a preferred embodiment, a maximum pressure and a minimum pressure of the filtered air is within 0.001% to 5% of an average pressure of the filtered air, wherein the average pressure is determined over 500 hours. In another embodiment, the pressure of the filtered air varies less than 100 Pascals (Pa), less than 50 Pa, or less than 25 Pa, or varies by 0.001 Pa to 100 Pa, 0.01 Pa to 50 Pa, or 0.1 Pa to 25 Pa, or 0.001 Pa, 0.01 Pa, or 0.1 Pa to 100 Pa, 50 Pa, or 25 Pa, over 1 to 500 hours, preferably 250 hours, wherein the upper and lower bounds may be independently combined. In yet another embodiment, the pressure of the filtered air varies less than 100 Pascals (Pa), less than 50 Pa, or less than 25 Pa, or varies by 0.001 Pa to 100 Pa, 0.01 Pa to 50 Pa, or 0.1 Pa to 25 Pa, or 0.001 Pa, 0.01 Pa, or 0.1 Pa to 100 Pa, 50 Pa, or 25 Pa of an average pressure of the filtered air, over 1 to 500 hours, preferably 250 hours, wherein the upper and lower bounds may be independently combined.

The method may further comprise combusting the combustible gas to produce a combustion gas. The combusting can be performed with a burner. Any suitable burner may be used. The burner is further disclosed above and the further description of the burner is not repeated for clarity. Also, the method may further comprise transferring heat from the combustion gas to a production fluid using a heat exchanger. The production fluid may be contained within a pressure vessel 180 and may wet, e.g., fully wet, an outer surface of a core 181 of the heat exchanger 182.

Also disclosed is a method of servicing a combustible gas supply system, the method comprising: filtering inlet air which comprises debris with the cyclonic filter to separate the debris from the inlet air and produce filtered air; collecting the debris in the debris receptacle; mixing the filtered air with the combustible gas; and opening the bottom plate of the debris receptacle to remove the debris from the debris receptacle to service the combustible gas supply system. The cyclonic filter, the debris receptacle, and the combustible gas are further disclosed above and the further description thereof is not repeated for clarity.

Also disclosed is a method of servicing a combustion gas supply system, the method comprising: filtering inlet air which comprises debris with the cyclonic filter to separate the debris from the inlet air and produce filtered air; collecting the debris in the debris receptacle; providing the filtered air to the burner; and opening the bottom plate of the debris receptacle to remove the debris from the debris receptacle to service the combustion gas supply system. The cyclonic filter, the debris receptacle, and the burner are further disclosed above and the description thereof is not repeated for clarity. In an embodiment, the debris receptacle may comprise an actuated bottom plate, and the method may further comprise actuating the actuated bottom plate to service the combustion gas supply system. The actuating may comprise remotely actuating.

As is further discussed above, an advantage of the disclosed system is that it can provide a constant pressure drop across the cyclonic air filter regardless of the debris content within the debris receptacle so long as the debris content remains below the bottom 102 of the body 101, specifically below the horizontal baffle 430, if present, so that the entrained debris does not enter the filtered airstream. In practice, the capacity of the debris receptacle is several orders of magnitude greater than that of a fibrous filter, and the total pressure drop across the cyclonic air filter is substantially constant, enabling improved burner operation which results in improved efficiency, more stable production capacity, improved burner durability, reduced combustion emissions, and reduced maintenance costs.

The cyclonic air filter 100 of the present disclosure, such as that shown in FIG. 12A and FIG. 12B, was used to collect empirical data on the efficiency and separation properties of the system for a cyclonic air filter with a barrel 104 diameter $D_1$ of 11 inches, a barrel height $H_1$ of 11 inches and a conical section 105 height $H_2$ of 22 inches. Test dust particles were introduced into the inlet air conduit 160 with the estimated statistical size distribution shown in Table 1.

TABLE 1

Test particle size distribution

| Particle Size (Micrometers) | Min % Below Size | Max Below Size | Average % Below Size |
|---|---|---|---|
| 1 | 1% | 2% | 1.5% |
| 2 | 4% | 5.5% | 4.8% |
| 3 | 7.5% | 9.5% | 8.5% |
| 4 | 10.5% | 13% | 11.8% |
| 5 | 15% | 19% | 17% |
| 7 | 28.0% | 33% | 30.5% |
| 10 | 40% | 45% | 42.5% |
| 20 | 65% | 69% | 67% |
| 40 | 84% | 88% | 86% |
| 80 | 99% | 100% | 99.5% |
| 120 | 100% | | 100% |

From these data, the test debris used was distributed so that approximately 42% of the dust is at or below 10 microns in aerodynamic diameter. Alternatively, if the cyclonic air filter is 70% efficient (30% passes through) and cyclonic air filters effectively separate large particles, the cutoff point for effective filtration is approximately 7 microns. Table 2 shows the results of a typical test of the cyclonic air filter 100 operating on the inlet air stream of a boiler combustion system with particulate debris introduced according to the size distribution of Table 1. A key property of the cyclonic air filter design is that a specific implementation tends to separate debris larger than a particular size corresponding to the loss rate $D_{50}$ defined as the cutoff debris size where 50% of the particles are lost in the clean air stream. Table 2 confirms that the implemented test prototype effectively filtered test particulate matter greater than approximately 10 micrometers.

TABLE 2

Cyclonic Air Filter Test Results

| | Efficiency | Loss Rate | $D_{50}$ |
|---|---|---|---|
| High Fire | 79% | 21% | 5.872 |
| Mid-Fire | 77% | 23% | 6.236 |
| Low Fire | 64% | 36% | 9.121 |

Figure 13:
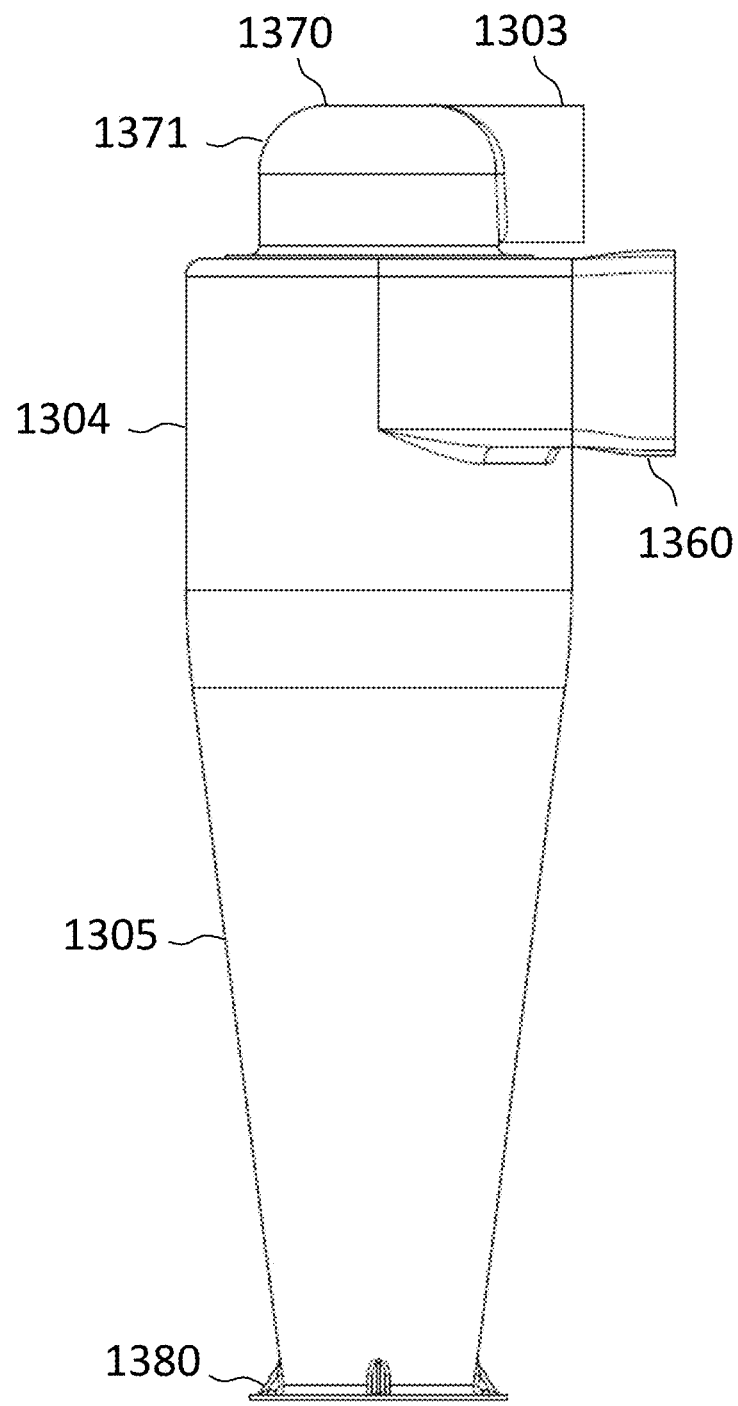
FIG. 13 is a side view of another embodiment of the cyclonic air filter, in accordance with embodiments of the present disclosure.
Figure 14:
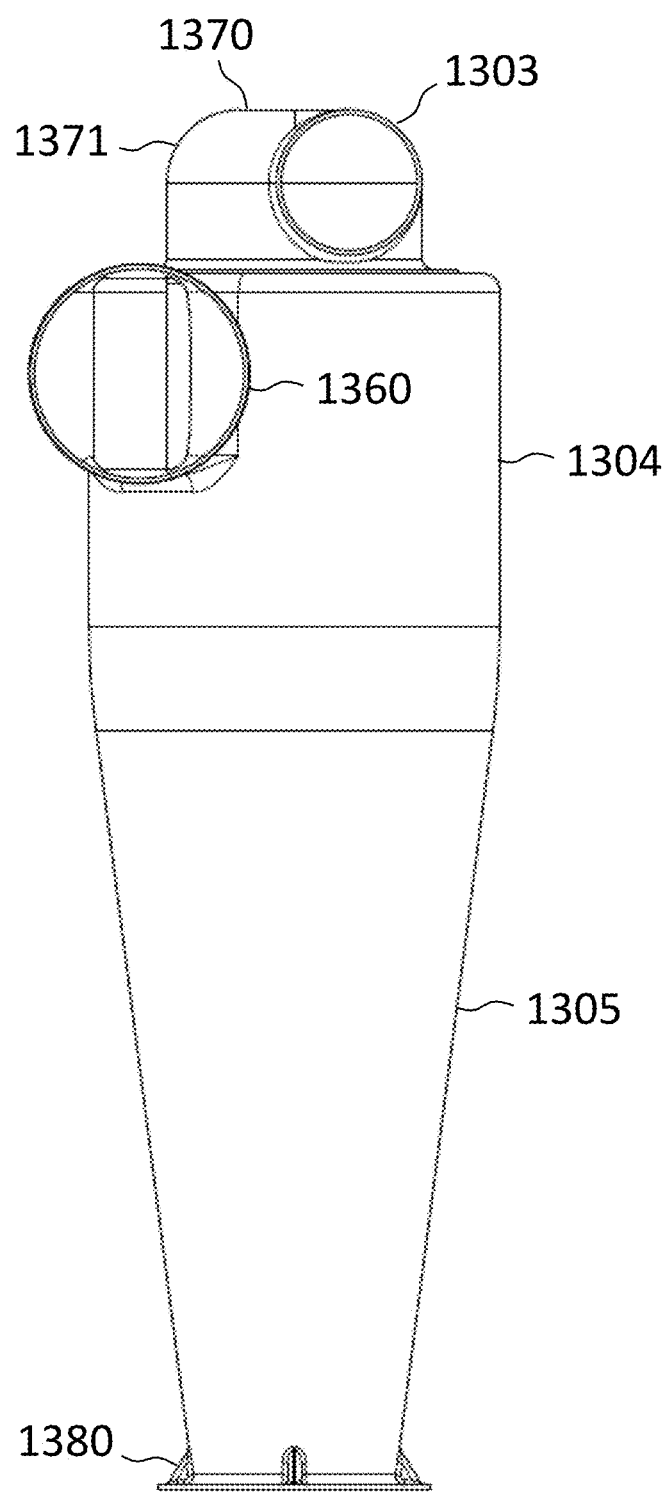
FIG. 14 is a front view of another embodiment of the cyclonic air filter, in accordance with embodiments of the present disclosure.

Referring to FIGS. 13 and 14, in some embodiments, the cyclonic air filter 100 may include a barrel 1304 section and a cone section 1305. An inlet 1360 is disposed on the barrel 1304. The inlet 1360 is circular, and has a diameter which is greater than a diameter of the outlet 1303. As is also shown in FIGS. 13 and 14, the cyclonic air filter comprises a cap 1370 comprising a radius 1371. The outlet 1303 is disposed on the cap 1370. Also shown in FIGS. 13 and 14 is a flange 1380, which is disposed on a bottom of the cone 1305. The cone 1305, the barrel 1304, the inlet 1360, and outlet 1303 may comprise static dissipating polyethylene, or any other material that provides a similar function and/or performance to that described herein.

A cross-sectional view of the debris receptacle 170 is shown in FIG. 15 for some embodiments of the present disclosure. The debris receptacle 170 comprises a steel can 1510 having a steel baffle 1530. The baffle 1530 defines an opening 1531 through which dust or debris is collected or passed. The lid 1515 of the can 1510 and the baffle 1530 may define an upper region 1520. In some embodiments the vortex does not enter the upper region 1520. Also shown in FIG. 15 is a sensor comprising an IR emitter 1540 and an IR receiver 1541. The IR emitter 1540 emits an infrared (IR) beam 1550 which is received by the receiver 1541. The sensor 1540,1541 is configured to provide a signal when a debris content level 930 breaks the IR beam 1550. A distance H between the beam 1550 and the opening 1531 may be any suitable dimension, and may be about 1 centimeter (cm) to 100 cm, about 2 cm to 50 cm, or about 3 cm to 25 cm. An embodiment in which the distance H is about 3 cm is preferred.

FIG. 16A through FIG. 16D show results generated by computer simulation comparing a test prototype implementation of the cyclonic air filter system shown in FIG. 12A to a combustion gas system with a industry standard mesh filter.

Figure 16A:
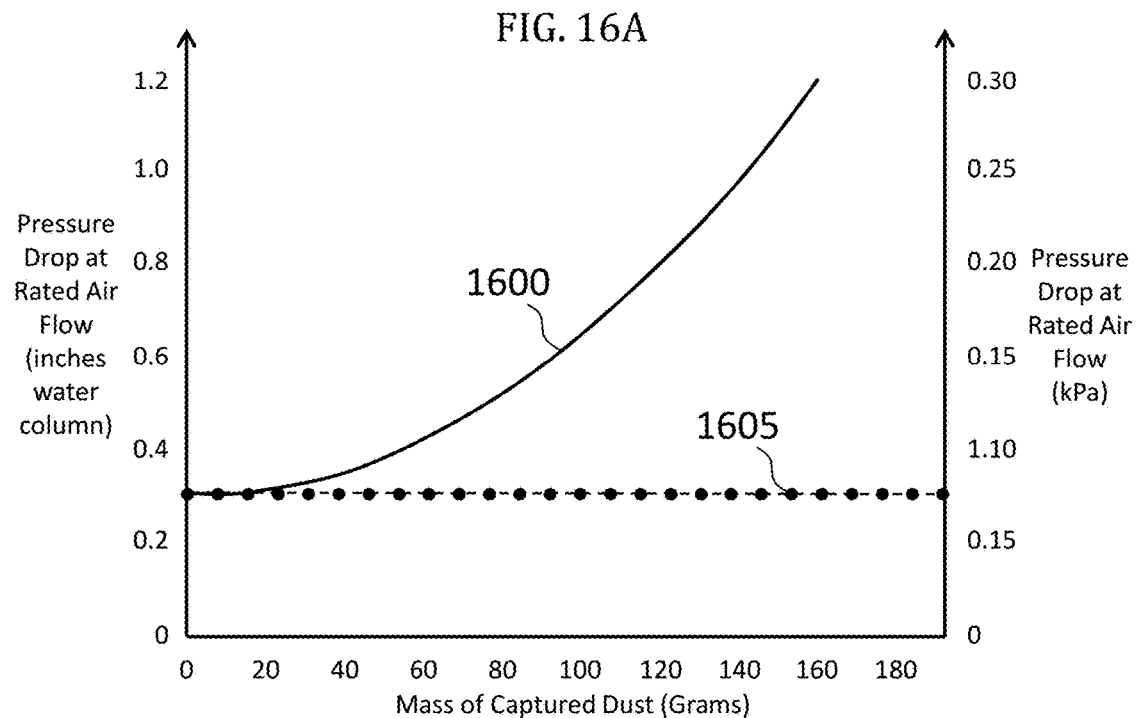
FIG. 16A is a plot showing a simulated pressure drop across a mesh air filter and across a cyclonic air filter, as a function of the mass of captured debris, in accordance with embodiments of the present disclosure.

FIG. 16A shows the pressure drop across a conventional mesh filter (curve 1600) as the pores of the mesh filter become clogged with debris and the pressure drop across the cyclonic air filter of the present disclosure (curve 1605). With no debris present, the mesh filter presents a flow resistance for a clean filter; for the case analyzed, this flow resistance results in a pressure drop of approximately 0.9 kPA for the simulated flow conditions. As the mesh filter pores capture debris (the mass of captured debris increases), the air flow resistance increases. For a fixed fan speed, this results in a reduction of the volumetric air flow and flow pressure downstream of the filter element. Conversely, for the cyclonic air filter of the present disclosure, the pressure drop 1605 remains substantially constant.

Figure 16B:
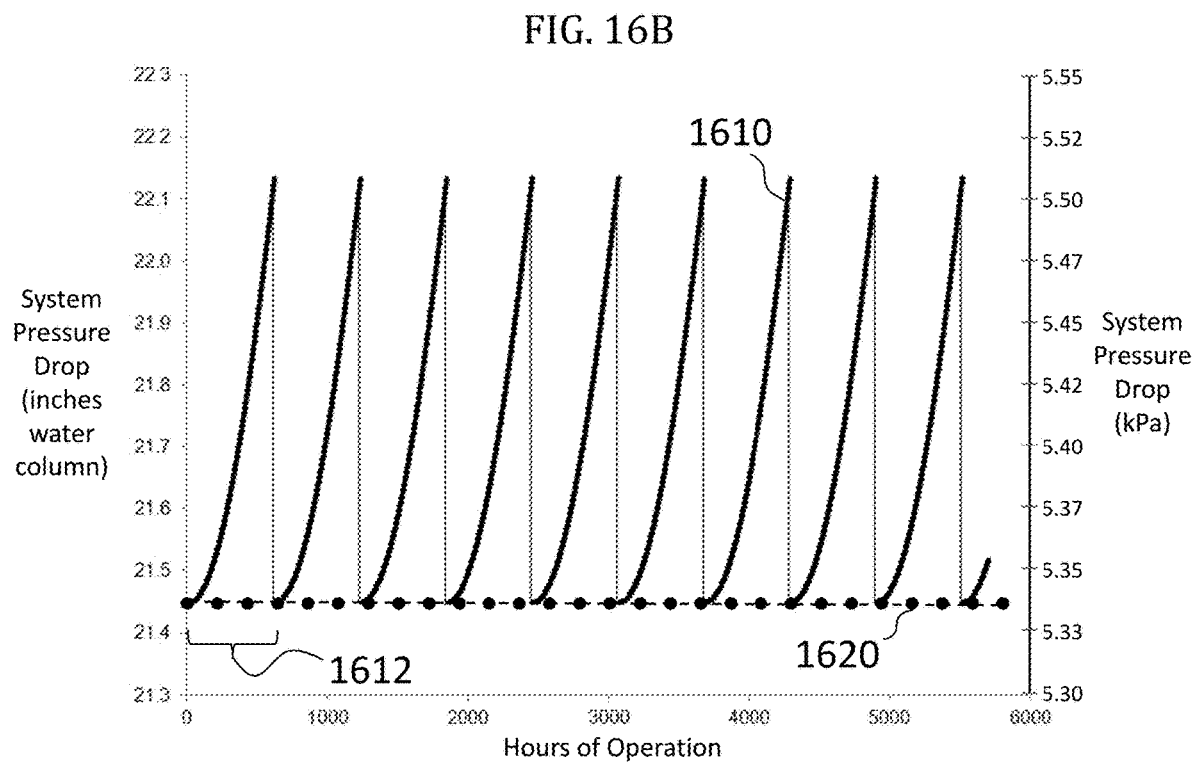
FIG. 16B is a plot showing simulated results for a comparison of pressure drop to a burner inlet for a mesh filter and the cyclonic air filter under the same conditions over an operational time period, in accordance with embodiments of the present disclosure.

FIG. 16B shows a operational boiler scenario comparing the cyclonic air filter of the present disclosure (curve 1620) to a conventional mesh filter (curve 1610) based on the system pressure drop dP shown in FIG. 1A, as measured from the filter inlet to the burner inlet assuming a distribution of airborne particulate debris for a simulated operation period of 6000 hours. Over this period, the system pressure drop 1610 for the simulated boiler with a mesh filter varies by approximately 0.17 kPa, assuming the mesh filter is cleaned or replaced when it is fully laden with debris. Mesh filter replacements are shown each time the mesh filter curve 1610 repeats itself, approx. every 800 hours, shown as a time span 1612. That requires nine simulated maintenance events over the 6000 operational period in this example. In comparison, the system pressure drop 1620 for the simulated boiler utilizing the cyclonic air filter of the present disclosure is constant over the same operational period, requiring no maintenance events and resulting in a substantially constant burner inlet air pressure over the entire simulated operational period.

Figure 16C:
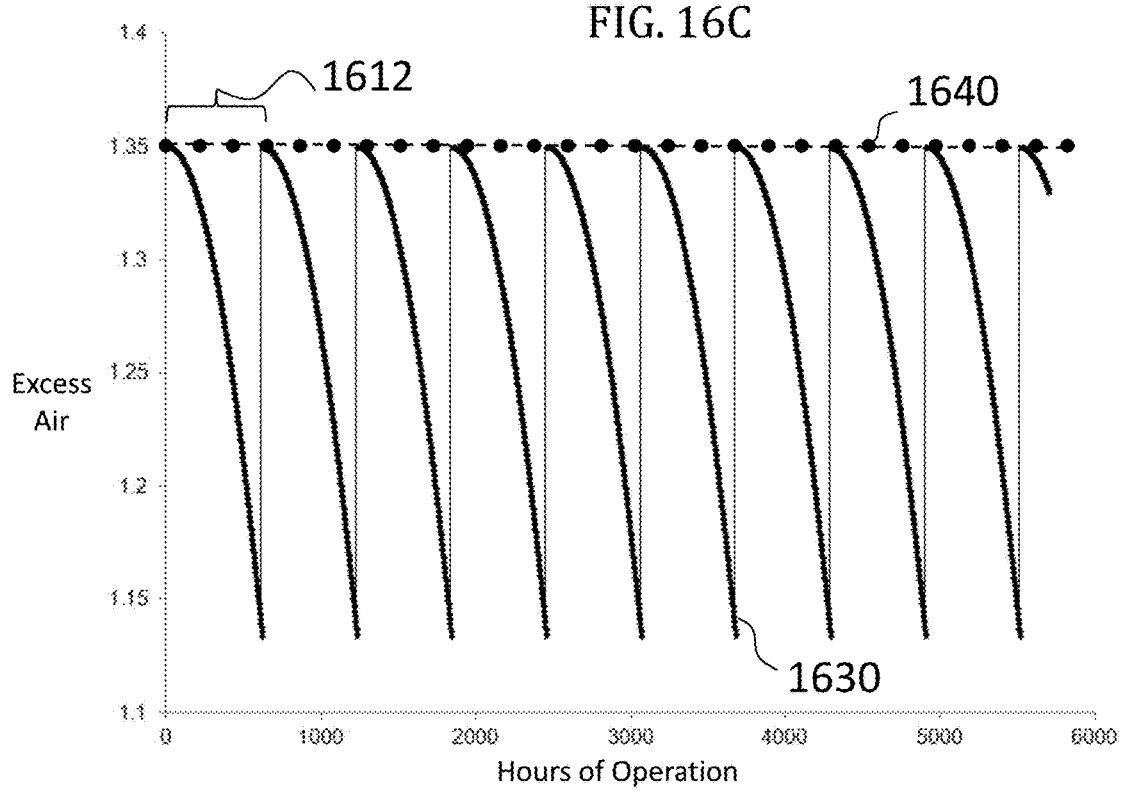
FIG. 16C is a plot showing simulated results for a comparison of excess air for a mesh filter and the cyclonic air filter under the same conditions over an operational time period in accordance with embodiments of the present disclosure.

FIG. 16C shows comparison data for the cyclonic air filter and the mesh filter data in the simulation described in FIG. 16A measuring boiler excess air (defined as volume of air supplied divided by the stoichiometric volume of air required for complete combustion of the fuel in the air stream) as the performance parameter. Again, the excess air is substantially constant (curve 1640) for the simulated case of a boiler with the cyclonic air filter of the present invention, while the excess decreases (curve 1630) for the mesh filter as its pores become clogged with particulate matter. Mesh filter replacements are shown each time the mesh filter curve 1630 repeats itself, approx. every 800 hours, shown as a time span 1612. An important result is that the burner temperature depends upon the excess air, so the variation of excess air results in a variation of burner temperature ranging (in this example) from 515° F. to 790° F., an effect that can have a detrimental impact on burner life and performance, not to mention the requirement for nine maintenance events over the simulated operational period. However, the substantially constant pressure drop across the cyclonic air filter ensures that the excess air into the burner also remains constant, maintaining a substantially constant burner temperature at the design point.

Figure 16D:
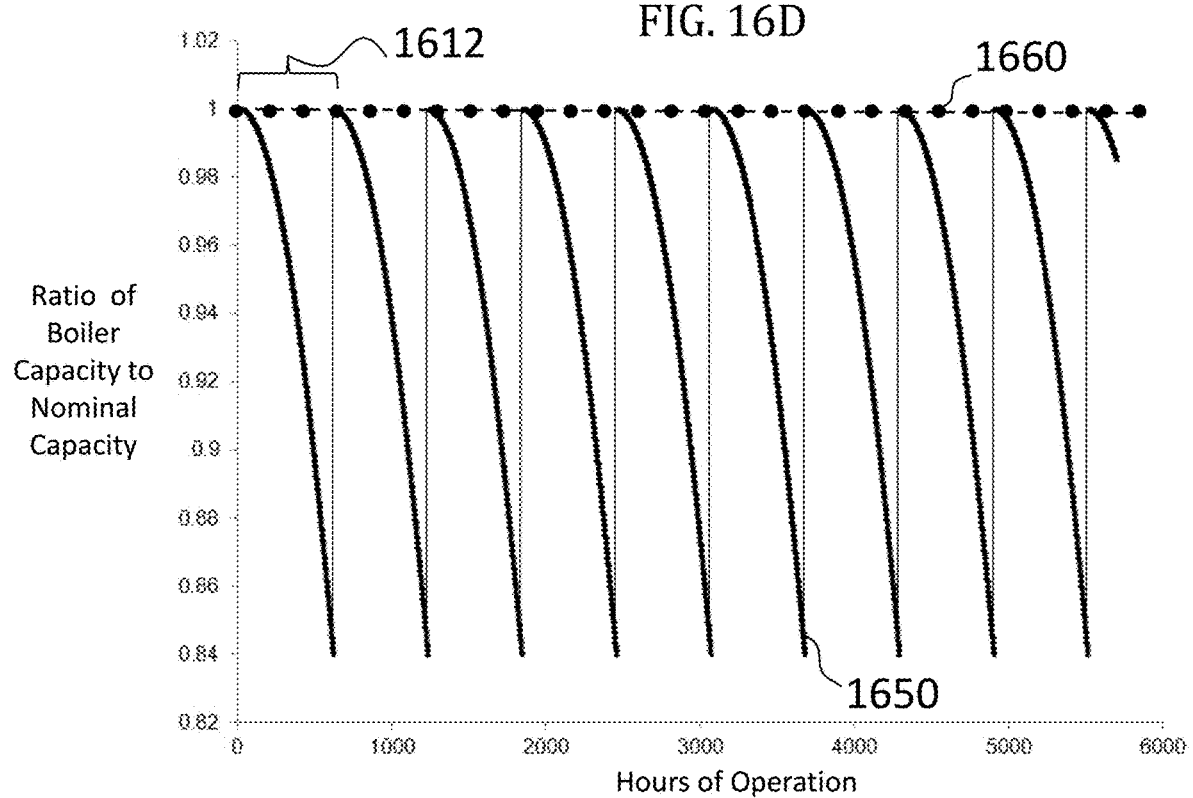
FIG. 16D is a plot showing simulated results for a comparison of the ratio of burner capacity with nominal burner capacity for a burner utilizing a mesh filter and the cyclonic air filter under the same conditions over an operational time period, in accordance with embodiments of the present disclosure.

FIG. 16D shows how the capacity of the boiler depends upon the performance of the inlet air filter in the case that venturi type controls are implemented, which reduce the gas flow in proportion to the air flow, the capacity of the boiler depends upon the performance of the inlet air filter. As the mesh filter pores fill with debris, the boiler capacity also degrades (curve 1650) by approximately 16% in comparison to its nominal design capacity. Since the cyclonic air filter burner inlet air pressure does not vary over the simulated 6000 hours operational period, the boiler capacity (curve 1660) also does not vary from its optimal design point. Mesh filter replacements are shown each time the mesh filter curve 1650 repeats itself, approx. every 800 hours, shown as a time span 1612.

Disclosed is a combustion gas supply system comprising: a cyclonic air filter; a blower having an inlet and an outlet; and a combustible gas inlet, wherein the cyclonic air filter, the blower, and the combustible gas inlet are in fluid communication. Also disclosed is a fluid heating system comprising: a combustion gas supply system comprising a cyclonic air filter, a blower having an inlet and an outlet, a combustible gas inlet, and a burner, wherein the cyclonic air filter, the blower, the combustible gas inlet and the burner are in fluid communication; and a heat exchanger, wherein the heat exchanger is in fluid communication with the burner. Also disclosed is a method of producing a combustible gas, the method comprising: directing air with a blower through a cyclonic filter to produce filtered air; and mixing the filtered air with a fuel to form the combustible gas. Also disclosed is a method of fluid heating, the method comprising: filtering air using a cyclonic filter to produce filtered air; directing the filtered air with a blower from the cyclonic filter to a burner; mixing the filtered air with a fuel to form a combustible mixture; combusting the combustible mixture to produce a combustion gas; and directing the combustion gas to a heat exchanger to heat a fluid. Also disclosed is a method of servicing a combustible gas supply system, the method comprising: filtering inlet air which comprises debris with a cyclonic filter to separate the debris from the inlet air and produce filtered air; collecting the debris in a debris receptacle; mixing the filtered air with a combustible gas; and opening a bottom plate of the debris receptacle to remove the debris from the debris receptacle to service the combustible gas supply system. Also disclosed is a method of servicing a combustion gas supply system, the method comprising: filtering inlet air which comprises debris with a cyclonic filter to separate the debris from the inlet air and produce filtered air; collecting the debris in a debris receptacle; providing the filtered air to a burner; and opening a bottom plate of the debris receptacle to remove the debris from the debris receptacle to service the combustion gas supply system.

In the various embodiments the cyclonic air filter may be connected to the inlet of the blower; and/or the combustible gas inlet is between the cyclonic air filter and the blower; and/or the cyclonic air filter may comprise an inlet disposed on a body, a debris receptacle disposed on a bottom of the body, and an outlet disposed on a top of the body; and/or may further comprise an articulated bottom plate on a bottom of the debris receptacle; and/or the debris receptacle may be removable; and/or the debris receptacle may comprise a removable drawer, which is configured to receive debris; and/or the debris receptacle may further comprises a sensor configured to indicate a debris content; and/or the sensor may comprise an optical break beam sensor which is configured to sense a debris content of the debris receptacle; and/or the sensor may comprise a first sensor and a second sensor, wherein the first sensor is configured to sense a first debris content and wherein the second sensor is configured to sense a second debris content, and wherein the first debris content and the second debris content are different; and/or the first sensor can be configured to sense a debris content of 30% to 60%, and wherein the second sensor is configured to sense a debris content of 70% to 100%, wherein each debris content is based on a total debris capacity of the debris receptacle; and/or may further comprising an alarm, wherein the alarm is configured to be actuated by the first sensor, the second sensor, or combination thereof; and/or may further comprising a burner, which is in fluid communication with the blower, and wherein the cyclonic air filter is upstream of the burner; and/or may further comprising a first conduit, which connects the cyclonic air filter and the blower, and a second conduit, which connects the blower and the burner; and/or the combustible gas inlet can be on the first conduit, the second conduit, or combination thereof; and/or may comprise directing air with a blower through a cyclonic filter to produce filtered air; and mixing the filtered air with a fuel to form the combustible gas; and/or the mixing of the filtered air with the fuel may precedes the directing the filtered air with the blower; and/or a maximum pressure and a minimum pressure of the filtered air can be within 5% of an average pressure of the filtered air, wherein the average pressure is determined over 500 hours; and/or may further comprise combusting the combustible gas with a burner to produce a combustion gas; and/or the debris receptacle can further comprise an actuated bottom plate, and wherein the method further comprises remotely actuating the actuated bottom plate to service the combustion gas supply system.

The invention has been described with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. Also, the element may be on an outer surface or on an inner surface of the other element, and thus "on" may be inclusive of "in" and "on."

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes," and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

What is claimed is:

1. A combustible gas supply system for a fluid heating system, comprising:
   a cyclonic air filter;
   a blower having a blower inlet and a blower outlet;
   a combustible gas inlet;
   wherein the cyclonic air filter, the blower, and the combustible gas inlet are in fluid communication, wherein the gas supply system is connected directly to a burner inlet of a mesh burner, and wherein the pressure drop across the gas supply system is substantially constant over a predetermined operating time;
   wherein the mesh burner is in fluid communication with the burner inlet, which provides hot combustion gas for use by a heat exchanger in fluid communication with the burner; and
   wherein the mesh burner comprises a fine porous mesh substrate on which combustion is sustained.

2. The combustible gas supply system of claim 1, wherein the cyclonic air filter is connected to the blower inlet.

3. The combustible gas supply system of claim 1, wherein the combustible gas inlet is between the cyclonic air filter and the blower.

4. The combustible gas supply system of claim 1, wherein the cyclonic air filter comprises:
   a filter inlet disposed on a filter body,
   a debris receptacle disposed on a bottom of the body, and
   a filter outlet disposed on a top of the body.

5. The combustible gas supply system of claim 4, further comprising an articulated bottom plate on a bottom of the debris receptacle.

6. The combustible gas supply system of claim 4, wherein the debris receptacle is removable.

7. The combustible gas supply system of claim 4, wherein the debris receptacle comprises a removable drawer, which is configured to receive debris.

8. The combustible gas supply system of claim 4, wherein the debris receptacle further comprises a sensor configured to indicate a debris content.

9. The combustible gas supply system of claim 8, wherein the sensor comprises an optical break beam sensor which is configured to sense a debris content of the debris receptacle.

10. The combustible gas supply system of claim 8, wherein the sensor comprises a first sensor and a second sensor, wherein the first sensor is configured to sense a first debris content and wherein the second sensor is configured to sense a second debris content, and wherein the first debris content and the second debris content are different.

11. The combustible gas supply system of claim 10, wherein the first sensor is configured to sense a debris content of 30% to 60%, and wherein the second sensor is configured to sense a debris content of 70% to 100%, wherein each debris content is based on a total debris capacity of the debris receptacle.

12. The combustible gas supply system of claim 10, further comprising an alarm, wherein the alarm is configured to be actuated by the first sensor, the second sensor, or combination thereof.

13. The combustible gas supply system of claim 1, wherein the cyclonic air filter is upstream of the blower.

14. The combustible gas supply system of claim 1, further comprising a first conduit, which connects the cyclonic air filter and the blower inlet, and a second conduit, which connects the blower outlet and the burner inlet.

15. The combustible gas supply system of claim 14, wherein the combustible gas inlet is on the first conduit, the second conduit, or combination thereof.

16. The system of claim 1, wherein the cyclonic air filter is configured to receive inlet air and to produce filtered air, and the pressure of the filtered air varies less than a predetermined amount over the predetermined operating time.

17. The system of claim 16, wherein a maximum pressure and a minimum pressure of the filtered air is within 5% of an average pressure of the filtered air, wherein the average pressure is determined over a time of 1 to 500 operating hours.

18. The system of claim 16, wherein the pressure of the filtered air varies less than 100 Pascals (Pa) over a time of 1 to 500 operating hours.

19. The system of claim 16, wherein the pressure of the filtered air varies less than 100 Pascals (Pa) of an average pressure of the filtered air, over a time of 1 to 500 operating hours.

20. A fluid heating system, comprising:
   a combustible gas supply system, comprising:
      a cyclonic air filter,
      a blower having a blower inlet and a blower outlet, and
      a combustible gas inlet,
      wherein the cyclonic air filter, the blower, and the combustible gas inlet are in fluid communication, wherein the gas supply system is connected directly to a burner inlet, and wherein the pressure drop across the combustible gas supply system is substantially constant over a predetermined operating time;
   a mesh burner in fluid communication with the burner inlet, wherein the mesh burner comprises a fine porous mesh substrate on which combustion is sustained; and
   a heat exchanger in fluid communication with the burner.

21. The fluid heating system of claim 20, wherein the cyclonic air filter provides filtered air to a conduit, the combustible gas inlet is disposed on the conduit and directs input fuel to the conduit, within which the filtered air and fuel are combined and provided to the blower inlet, and the blower outlet is in fluid communication with the burner inlet.

22. The fluid heating system of claim 20, wherein the cyclonic air filter is upstream of the blower.

23. A method of producing a combustible gas for a fluid heating system, comprising:
   directing air with a blower through a cyclonic filter to produce filtered air;
   mixing the filtered air with a fuel to form the combustible gas;
   directing the combustible gas directly to a burner inlet of a mesh burner;
   wherein the pressure of the combustible gas at the burner inlet is substantially constant over a predetermined operating time;
   wherein the mesh burner is in fluid communication with the burner inlet, the burner providing hot combustion gas for use by a heat exchanger in fluid communication with the burner; and
   wherein the mesh burner comprises a fine porous mesh substrate on which combustion is sustained.

24. The method of claim 23, wherein a maximum pressure and a minimum pressure of the filtered air is within 5% of an average pressure of the filtered air, wherein the average pressure is determined over 1 to 500 operating hours.

25. The method of claim 23, wherein the pressure of the filtered air varies less than a predetermined amount over the predetermined operating time.

26. The method of claim 23, wherein the pressure of the filtered air varies less than 100 Pascals (Pa) over a time of 1 to 500 operating hours.

27. The method of claim 23, wherein the pressure of the filtered air varies less than 100 Pascals (Pa) of an average pressure of the filtered air, over a time of 1 to 500 operating hours.

28. The method of claim 23, further comprising trapping debris with a debris receptacle connected to the cyclonic air filter, the receptacle having a removable drawer.

29. The method of claim 28, further comprising sounding an alarm when an amount of debris in the debris receptacle reaches a predetermined level.

30. The method of claim 23, wherein the directing is performed by creating a vacuum with the blower to cause air to be directed through the cyclonic air filter.

* * * * *